United States Patent
Toshioka et al.

(10) Patent No.: US 7,146,800 B2
(45) Date of Patent: Dec. 12, 2006

(54) EXHAUST PURIFICATION DEVICE AND EXHAUST PURIFICATION METHOD OF INTERNAL COMBUSTION ENGINE

(75) Inventors: Shunsuke Toshioka, Numazu (JP); Shinya Hirota, Susono (JP); Takamitsu Asanuma, Mishima (JP); Yasuaki Nakano, Sunto-gun (JP); Kohei Yoshida, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 261 days.

(21) Appl. No.: 10/865,875

(22) Filed: Jun. 14, 2004

(65) Prior Publication Data

US 2004/0255577 A1 Dec. 23, 2004

(30) Foreign Application Priority Data

Jun. 17, 2003 (JP) ............................. 2003-172072
Dec. 24, 2003 (JP) ............................. 2003-427779

(51) Int. Cl.
 *F01N 3/00* (2006.01)
(52) U.S. Cl. ..................... 60/285; 60/274; 60/278; 60/295; 60/297
(58) Field of Classification Search .............. 60/274, 60/276, 278, 285, 286, 284, 295, 297, 301
See application file for complete search history.

(56) References Cited

U.S. PATENT DOCUMENTS

| | | | | |
|---|---|---|---|---|
| 5,746,989 A | * | 5/1998 | Murachi et al. | 423/213.7 |
| 6,134,883 A | * | 10/2000 | Kato et al. | 60/274 |
| 6,233,927 B1 | * | 5/2001 | Hirota et al. | 60/297 |
| 6,293,096 B1 | * | 9/2001 | Khair et al. | 60/286 |
| 6,775,972 B1 | * | 8/2004 | Twigg et al. | 60/275 |
| 6,912,847 B1 | * | 7/2005 | Deeba | 60/297 |
| 6,964,157 B1 | * | 11/2005 | Adelman et al. | 60/278 |
| 2003/0182933 A1 | | 10/2003 | Adelman et al. | |

FOREIGN PATENT DOCUMENTS

| | | |
|---|---|---|
| DE | 196 45 689 A1 | 5/1998 |
| DE | 100 03 219 A1 | 8/2001 |
| DE | 100 23 439 A1 | 11/2001 |
| EP | 0 869 267 A2 | 10/1998 |
| EP | 0 982 486 A2 | 3/2000 |
| EP | 1 308 617 A1 | 5/2003 |
| JP | A 6-108826 | 4/1994 |
| JP | A 7-139340 | 5/1995 |
| JP | A 11-107811 | 4/1999 |
| WO | WO 98/10177 | 3/1998 |

* cited by examiner

*Primary Examiner*—Tu M. Nguyen
(74) *Attorney, Agent, or Firm*—Oliff & Berridge, PLC

(57) ABSTRACT

An exhaust purification device, including a $NO_x$ storing catalyst comprised of a precious metal catalyst and $NO_x$ absorbent, arranged in an engine exhaust passage, which increases the ratio of the nitrogen dioxide to the nitrogen monoxide produced when burning fuel under a lean air-fuel ratio when the $NO_x$ storing catalyst is not active compared with the time when the $NO_x$ storing catalyst is active under the same engine operating conditions and stores the nitrogen dioxide contained in the exhaust gas in the $NO_x$ absorbent at that time.

19 Claims, 22 Drawing Sheets

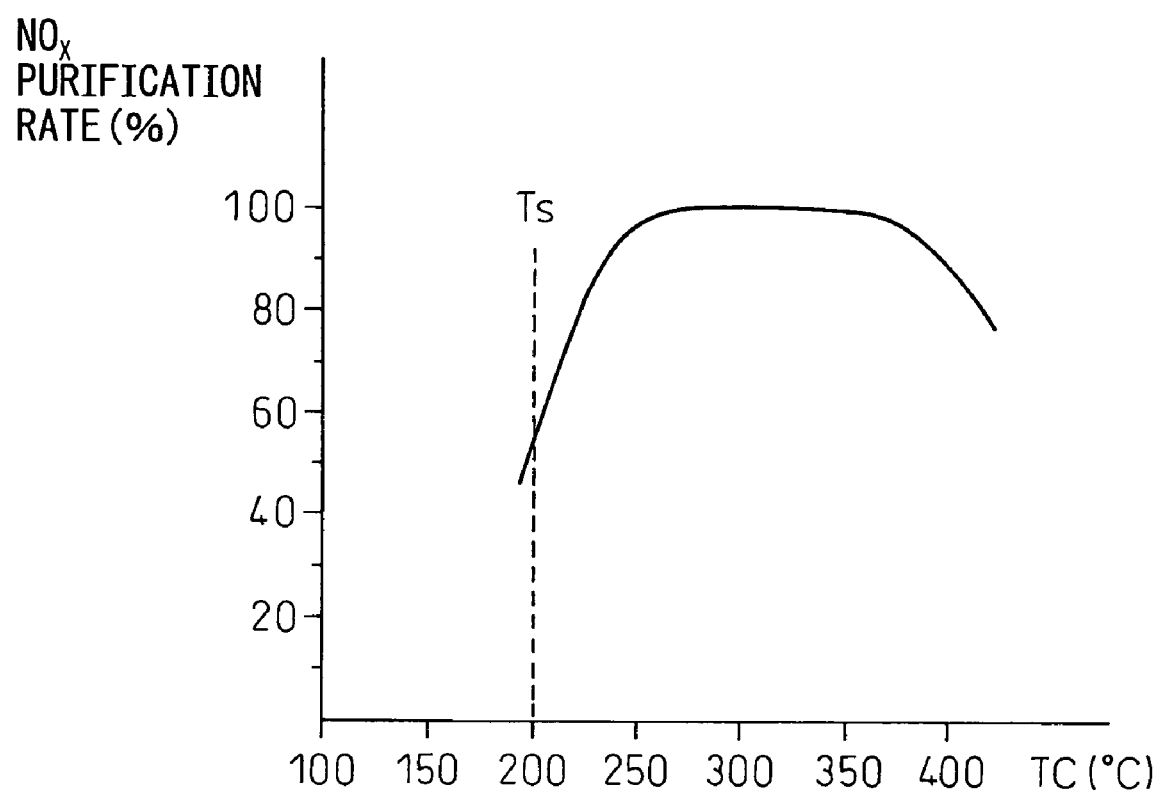

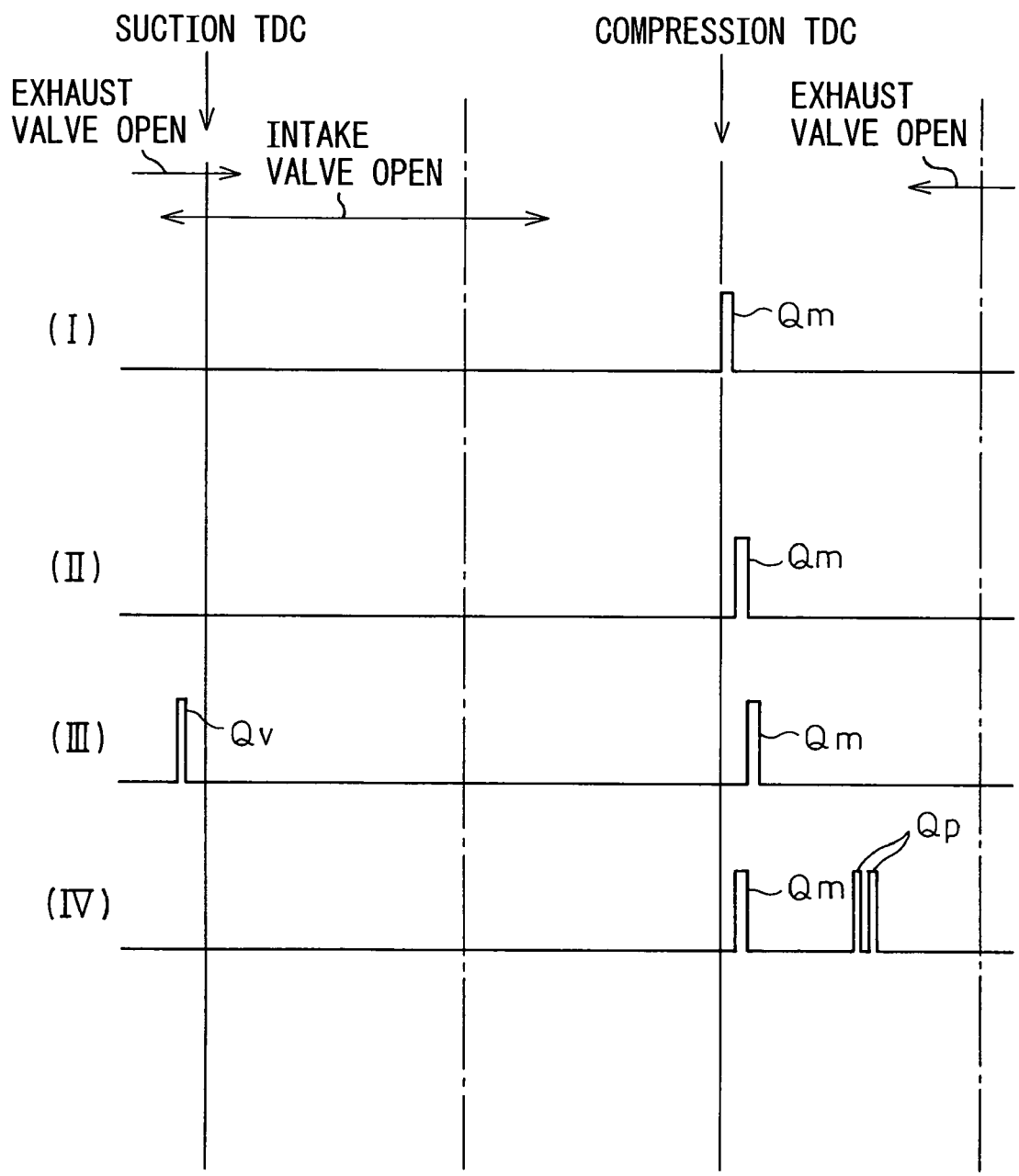

EXHAUST PURIFICATION DEVICE AND EXHAUST PURIFICATION METHOD OF INTERNAL COMBUSTION ENGINE

BACKGROUND OF THE INVENTION

1. Field of the Invention

The present invention relates to an exhaust purification device and exhaust purification method of an internal combustion engine.

2. Description of the Related Art

As a catalyst for purifying $NO_x$ contained in exhaust gas when fuel is burned under a lean air-fuel ratio, there is known a catalyst comprised of a carrier made of alumina on the surface of which a layer of a $NO_x$ absorbent comprised of an alkali metal or alkali earth is formed and on the surface of which a precious metal catalyst such as platinum is carried (for example, see Japanese Unexamined Patent Publication (Kokai) No. 6-108826). In this catalyst, when the catalyst is activated and the air-fuel ratio of the exhaust gas is lean, the $NO_x$ contained in the exhaust gas is absorbed in the $NO_x$ absorbent, while when the air-fuel ratio of the exhaust gas is made rich, the $NO_x$ which had been absorbed in the $NO_x$ absorbent is released and reduced.

However, this $NO_x$ absorption and release action is believed not to be performed when the catalyst is not activated. Therefore, in the internal combustion engine described in the above publication, when the catalyst is not activated, the catalyst is heated by an electric heater.

The inventors researched catalysts designed to perform this $NO_x$ absorption and release action and as a result discovered that while the nitrogen monoxide contained in exhaust gas is not absorbed in the $NO_x$ absorbent when the catalyst is not activated, nitrogen dioxide contained in exhaust gas is stored in the $NO_x$ absorbent even when the catalyst is not activated.

SUMMARY OF THE INVENTION

An object of the present invention is to provide an exhaust purification device and exhaust purification method designed to purify exhaust gas utilizing this fact discovered by the inventors.

According to a first aspect of the present invention, there is provided an exhaust purification device comprising a $NO_x$ storing catalyst comprised of a precious metal catalyst and a $NO_x$ absorbent and arranged in an engine exhaust passage, the $NO_x$ absorbent storing nitrogen dioxide $NO_2$ contained in the exhaust gas when an air-fuel ratio of exhaust gas flowing into the $NO_x$ storing catalyst is lean when the $NO_x$ storing catalyst is not activated, the $NO_x$ absorbent storing nitrogen oxides $NO_x$ contained in exhaust gas when the air-fuel ratio of the exhaust gas flowing into the $NO_x$ storing catalyst is lean when the $NO_x$ storing catalyst is activated, the $NO_x$ absorbent releasing stored nitrogen oxides $NO_x$ when the air-fuel ratio of the exhaust gas flowing into the $NO_x$ storing catalyst becomes the stoichiometric air-fuel ratio or rich; a $NO_2$ ratio increasing apparatus for increasing a ratio of nitrogen dioxide $NO_2$ with respect to nitrogen monoxide NO produced when burning fuel under a lean air-fuel ratio when the $NO_x$ storing catalyst is not activated compared with when the $NO_x$ storing catalyst is activated under the same engine operating conditions; an air-fuel ratio switching apparatus for temporarily switching the air-fuel ratio of the exhaust gas flowing into the $NO_x$ storing catalyst cyclically from lean to a stoichiometric air-fuel ratio or rich so as to release $NO_x$ from the $NO_x$ absorbent when the $NO_x$ storing catalyst is activated.

According to a second aspect of the present invention, there is provided an exhaust purification method of an internal combustion engine comprising using a $NO_x$ storing catalyst comprised of a precious metal catalyst and a $NO_x$ absorbent as a catalyst for purifying $NO_x$ in exhaust gas; increasing a ratio of nitrogen dioxide $NO_2$ with respect to nitrogen monoxide NO produced when burning fuel under a lean air-fuel ratio when the $NO_x$ storing catalyst is not activated compared with when the $NO_x$ storing catalyst is activated under the same engine operating conditions; storing the nitrogen dioxide $NO_2$ contained in the exhaust gas in the $NO_x$ absorbent at that time; changing nitrogen dioxide $NO_2$ stored in the $NO_x$ absorbent to nitric acid ions $NO_3^-$ when the temperature of the $NO_x$ storing catalyst rises; cyclically temporarily switching the air-fuel ratio of the exhaust gas flowing into the $NO_x$ storing catalyst from lean to a stoichiometric air-fuel ratio or rich when the $NO_x$ storing catalyst is activated; and thereby releasing nitrogen oxides $NO_x$ stored in the $NO_x$ absorbent in the form of nitric acid ions $NO_3^-$ from the $NO_x$ absorbent.

BRIEF DESCRIPTION OF THE DRAWINGS

These and other objects and features of the present invention will become clearer from the following description of the preferred embodiments given with reference to the attached drawings, wherein:

FIG. 3 is a view of a $NO_x$ purification rate;

FIG. 4 is a view of various injection patterns of fuel;

DESCRIPTION OF THE PREFERRED EMBODIMENTS

Preferred embodiments of the present invention will be described in detail below while referring to the attached figures.

Figure 1:
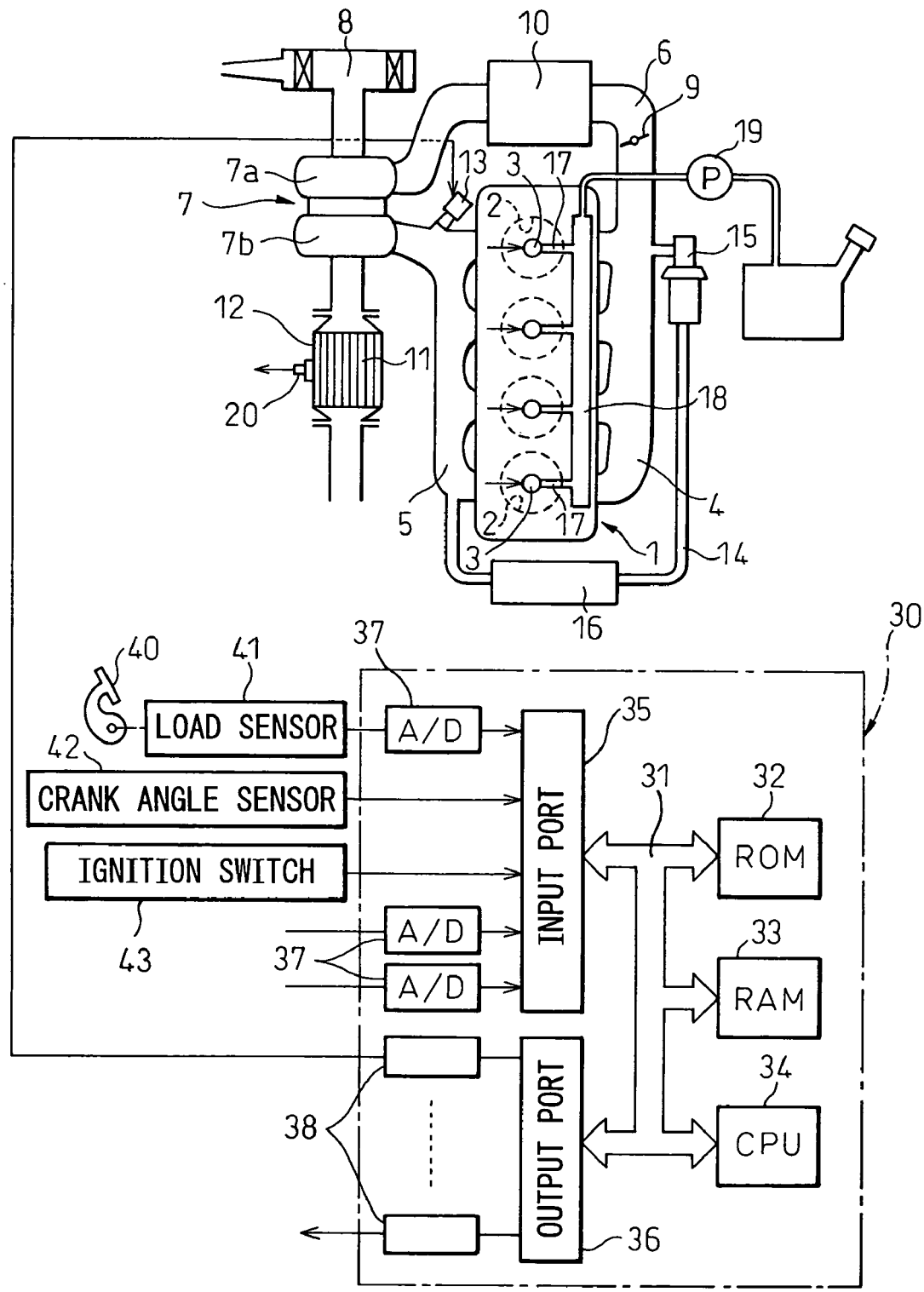
FIG. 1 is an overview of a compression ignition type internal combustion engine.

FIG. 1 shows the case of application of the present invention to a compression ignition type internal combustion engine. Note that the present invention may also be applied to a spark ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7. The inlet of the compressor 7a is connected to an air cleaner 8. Inside the intake duct 6 is arranged a throttle valve 9 driven by a step motor. Further, around the intake duct 6 is arranged a cooling device 10 for cooling the intake air flowing through the inside of the intake duct 6. In the embodiment shown in FIG. 1, the engine cooling water is guided into the cooling device 10. The engine cooling water cools the intake air. On the other hand, the exhaust manifold 5 is connected to an inlet of an exhaust turbine 7b of the exhaust turbocharger 7, while the outlet of the exhaust turbine 7b is connected to a casing 12 housing a $NO_x$ storing catalyst 11. The outlet of the collecting portion of the exhaust manifold 5 is provided with a reducing agent supply valve 13 for supplying a reducing agent comprised of for example hydrocarbons into the exhaust gas flowing through the inside of the exhaust manifold 5.

The exhaust manifold 5 and the intake manifold 4 are linked together through an exhaust gas recirculation (hereinafter referred to as an "EGR") passage 14. The EGR passage 14 is provided with an electronically controlled EGR control valve 15. Further, around the EGR passage 14 is arranged a cooling device 16 for cooling the EGR gas flowing through the inside of the EGR passage 14. In the embodiment shown in FIG. 1, the engine cooling water is guided into the cooling device 16. The engine cooling water cools the EGR gas. On the other hand, each fuel injector 3 is linked through a fuel feed tube 17 to a fuel reservoir, that is, a so-called common rail 18. This common rail 18 is supplied with fuel from an electronically controlled variable discharge fuel pump 19. The fuel supplied into the common rail 18 is supplied through each fuel feed tube 17 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31. The $NO_x$ storing catalyst 11 is provided with a temperature sensor 20 for detecting the temperature of the $NO_x$ storing catalyst 11. The output signal of the temperature sensor 20 is input to the input port 35 through a corresponding AD converter 37. Further, an accelerator pedal 40 has a load sensor 41 generating an output voltage proportional to the amount of depression L through a corresponding AD converter 37 connected to it. The output voltage of the load sensor 41 is input to the input port 35 through a corresponding AD converter 37. Further, the input port 35 has a crank angle sensor 42 generating an output pulse each time the crankshaft turns for example by 15 degrees connected to it.

Further, the input port 35 receives as input an on/off signal of an ignition switch 43. On the other hand, the output port 36 is connected through corresponding drive circuits 38 to the fuel injectors 3, throttle valve 9 step motor, reducing agent supply valve 13, EGR control valve 15, and fuel pump 19.

Figure 2A:
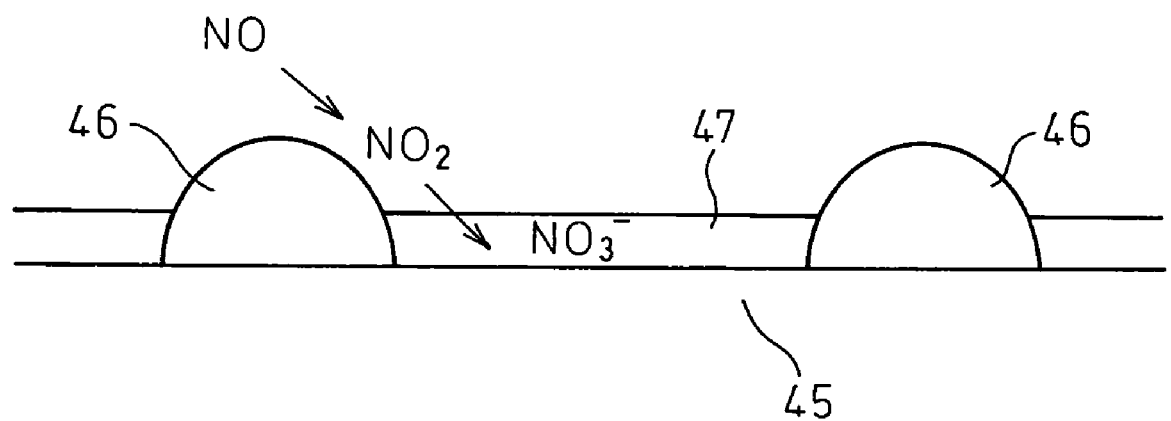
FIGS. 2A and 2B are views schematically showing cross-sections of the carrier surface part of a $NO_x$ storing catalyst.
Figure 2B:
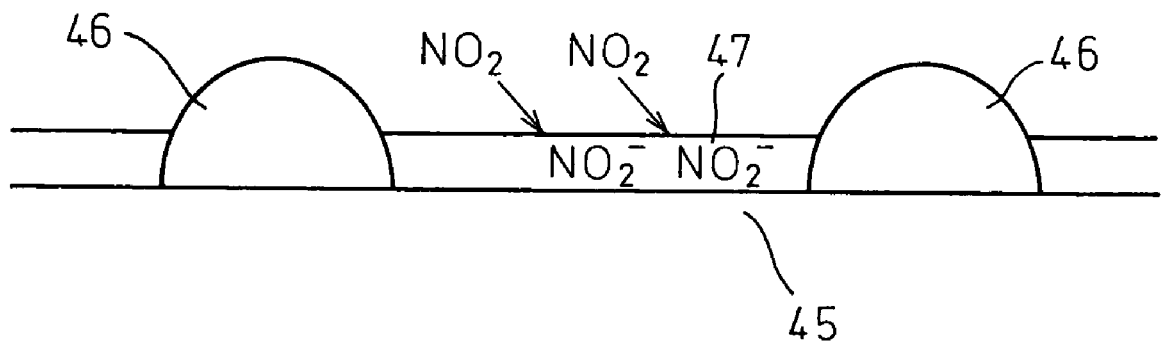

The $NO_x$ storing catalyst 11 shown in FIG. 1 is comprised of a monolithic catalyst. A base of the $NO_x$ storing catalyst 11 carries for example a catalyst carrier comprised of alumina. FIGS. 2A and 2B schematically show the cross-section of the surface part of this catalyst carrier 45. As shown in FIGS. 2A and 2B, the catalyst carrier 45 carries a precious metal catalyst 46 dispersed on its surface. Further, the catalyst carrier 45 is formed with a layer of a $NO_x$ absorbent 47 on its surface.

In this embodiment of the present invention, platinum Pt is used as the precious metal catalyst 46. As the ingredient forming the $NO_x$ absorbent 47, for example, at least one element selected from potassium K, sodium Na, cesium Cs, or another alkali metal, barium Ba, calcium Ca, or another alkali earth, lanthanum La, yttrium Y, or another rare earth may be used.

If the ratio of the air and fuel (hydrocarbons) supplied to the engine intake passage, combustion chambers 2, and exhaust passage upstream of the $NO_x$ storing catalyst 11 is referred to as the "air-fuel ratio of the exhaust gas", the $NO_x$ absorbent 47 performs a $NO_x$ absorption and release action of absorbing $NO_x$ when the air-fuel ratio of the exhaust gas is lean when the previous metal catalyst 46 is activated, that is, when the $NO_x$ storing catalyst 11 is activated, and releasing the absorbed $NO_x$ when the oxygen concentration in the exhaust gas falls. Note that when fuel (hydrocarbons) or air is not being supplied to the exhaust passage upstream of the $NO_x$ storing catalyst 11, the air-fuel ratio of the exhaust gas matches the air-fuel ratio of the air-fuel mixture supplied to the combustion chambers 2. Therefore, in this case, the $NO_x$ absorbent 47 absorbs $NO_x$ when the air-fuel ratio of the air-fuel mixture supplied into the combustion chambers 2 is lean, while releases the absorbed $NO_x$ when the oxygen concentration in the air-fuel mixture supplied to the combustion chambers 2 falls.

That is, if explaining this taking as an example the case of using barium Ba as the ingredient forming the $NO_x$ absorbent 47, when the air-fuel ratio of the exhaust gas is lean, that is, when the oxygen concentration in the exhaust gas is high, if the precious metal catalyst 46 is activated, the NO contained in the exhaust gas is oxidized on the platinum Pt 46 such as shown in FIG. 2A to become $NO_2$, then is absorbed in the $NO_x$ absorbent 47 and disperses in the $NO_x$ absorbent 47 in the form of sulfuric acid ions $NO_3^-$ while bonding with the barium oxide BaO. In this way, the $NO_x$ is absorbed in the $NO_x$ absorbent 47. So long as the oxygen concentration in the exhaust gas is high, $NO_2$ is produced on the surface of the platinum Pt 46. So long as the $NO_x$ absorption capacity of the $NO_x$ absorbent 47 is not saturated, the $NO_2$ is absorbed in the $NO_x$ absorbent 47 and nitric acid ions $NO_3^-$ are produced.

As opposed to this, by making the air-fuel ratio in the combustion chambers 2 rich or the stoichiometric air-fuel ratio or by supplying a reducing agent from the reducing agent supply valve 13 so as to make the air-fuel ratio of the exhaust gas rich or the stoichiometric air-fuel ratio, the oxygen concentration in the exhaust gas falls, so the reaction proceeds in the reverse direction ($NO_3^- \rightarrow NO_2$) and therefore the nitric acid ions $NO_3^-$ in the $NO_x$ absorbent 47 are released from the $NO_x$ absorbent 47 in the form of $NO_2$.

Next, the released $NO_x$ is reduced by the unburned HC and CO contained in the exhaust gas.

However, the platinum Pt 46 inherently has activity at a low temperature. However, the basicity of the $NO_x$ absorbent 47 is considerably strong. Therefore, the activity of the platinum Pt 46 at a low temperature, that is, the acidity, ends up becoming weak. As a result, if the temperature TC of the nitrogen storing catalyst 11 falls, the oxidation action of the NO becomes weaker. When the temperature TC of the nitrogen storing catalyst 11 falls as shown in FIG. 3, the $NO_x$ purification rate falls. In this embodiment according to the present invention, as will be understood from FIG. 3, if the temperature TC of the nitrogen storing catalyst 11 falls below about 250° C., the $NO_x$ purification rate falls rapidly. When the temperature TC of the $NO_x$ storing catalyst 11 reaches about 200° C., the $NO_x$ purification rate becomes about 50 percent. In this embodiment according to the present invention, when the $NO_x$ purification rate becomes about 50 percent, that is, when the temperature TC of the nitrogen storing catalyst 11 becomes about 200° C. (=Ts), it is judged that the nitrogen storing catalyst 11 is activated.

Now, the nitrogen oxides $NO_x$ in the exhaust gas are not absorbed in the $NO_x$ absorbent 47 in the form of nitrogen monoxide $NO_x$. They have to be converted to the form of nitrogen dioxide $NO_2$ or else will not be absorbed in the $NO_x$ absorbent 47. That is, the majority of the nitrogen oxides $NO_x$ contained in exhaust gas is usually nitrogen monoxide $NO_x$. This nitrogen monoxide NO has to be converted to nitrogen dioxide $NO_2$, that is, has to be oxidized, or will not be absorbed in the $NO_x$ absorbent 47. To oxidize nitrogen monoxide $NO_x$ it is necessary that the precious metal catalyst 46 be activated. Therefore, up until now, to purify $NO_x$, it had been considered necessary that the precious metal catalyst 46 be activated.

The inventors engaged in research on this nitrogen storing catalyst 11 and as a result learned that the nitrogen monoxide contained in exhaust gas is not absorbed in the $NO_x$ absorbent 47 if the platinum 46 is not activated, that is, if the nitrogen storing catalyst 11 is not activated, but the nitrogen dioxide is stored in the $NO_x$ absorbent 47 in the form of for example nitric acid $NO_2^-$ as shown in FIG. 2B even if the nitrogen storing catalyst 11 is not activated. Note that in this case, it is not necessarily clear whether the nitrogen dioxide $NO_2$ is adsorbed at the $NO_x$ absorbent 47 or is absorbed in the $NO_x$ absorbent 47. This adsorption and absorption are referred to together as "storage".

In this way, since the nitrogen dioxide $NO_2$ is stored even without the $NO_x$ storing catalyst 11 being activated, when the $NO_x$ storing catalyst 11 is not activated, for example for a while after the engine startup, it is preferable to reduce the amount of nitrogen monoxide NO in the exhaust gas and increase the amount of the nitrogen dioxide $NO_2$ in the exhaust gas. Therefore, in this embodiment according to the present invention, when the $NO_x$ storing catalyst 11 is not activated, the ratio of the nitrogen dioxide $NO_2$ with respect to the nitrogen monoxide NO produced when the fuel is burned under a lean air-fuel ratio is increased compared with the time of the activity of the $NO_x$ storing catalyst at the same engine operating conditions, that is, the same rotational speed and the same torque.

However, the $NO_x$ produced due to combustion, that is, the $NO_x$ produced by a high temperature, takes the form of $NO_x$. Therefore, as mentioned above, the majority of the $NO_x$ contained in exhaust gas is $NO_x$. However, in a low temperature atmosphere where the atmospheric temperature in the combustion chambers 2 becomes lower than for example 500° C. from the expansion stroke to the exhaust stroke, the HC radicals and NO included in the burned gas react and as a result $NO_2$ is produced. That is, if possible to lower the atmospheric temperature in the combustion chambers 2 from the expansion stroke to the exhaust stroke, the ratio of the $NO_2$ in the exhaust gas (amount of $NO_2$/amount of NO) can be increased.

In this case, if performing slow combustion so as to prevent the combustion chamber from becoming a high temperature, the atmospheric temperature in the combustion chambers 2 will fall from the expansion stroke to the exhaust stroke. Therefore, one method for increasing the ratio of the $NO_2$ would be slow combustion. In this case, at least one of delay of the fuel injection timing until before compression top dead center, increase of the amount of EGR gas, pilot injection, or premix combustion is performed so as to slow the combustion. Therefore, in several embodiments according to the present invention, when the $NO_x$ storing catalyst 11 is not activated, combustion is slowed compared with when the $NO_x$ storing catalyst is activated in the same engine operating state.

As explained above, when the $NO_x$ storing catalyst 11 is not activated, as shown in FIG. 2B, the nitrogen dioxide $NO_2$ contained in the exhaust gas is stored in the $NO_x$ absorbent 47. Next, when the temperature TC of the $NO_x$ storing catalyst 11 rises, the nitrogen dioxide $NO_2$ stored in the $NO_x$ absorbent 47 is changed to nitric acid ions $NO_3^-$ and therefore when the $NO_x$ storing catalyst 11 is activated, the stored nitrogen dioxide $NO_2$ is absorbed in the $NO_x$ absorbent 47 in the form of nitric acid ions $NO_3^-$.

Now, if fuel is burned under a lean air-fuel ratio when the $NO_x$ storing catalyst 11 is activated, the $NO_x$ in the exhaust gas is absorbed in the $NO_x$ absorbent 47. However, if combustion continues under a lean air-fuel ratio, the $NO_x$ absorbing capacity of the $NO_x$ absorbent 47 ends up becoming saturated during that period. Therefore, $NO_x$ ends up being unable to be absorbed by the $NO_x$ absorbent 47. Accordingly, in this embodiment of the present invention, reducing agent is supplied from the reducing agent supply valve 13 before the absorbing capacity of the $NO_x$ absorbent 47 becomes saturated so as to make the air-fuel ratio of the exhaust gas temporarily rich and thereby make the $NO_x$ absorbent 47 release the $NO_x$.

However, if the ratio of the $NO_2$ is increased as in the present invention while the $NO_x$ storing catalyst 11 is not activated, for example, after engine startup until the $NO_x$ storing catalyst 11 is activated, a large amount of $NO_2$ will probably be stored in the $NO_x$ absorbent 47 around when the $NO_x$ storing catalyst 11 is activated. Therefore, in this embodiment of the present invention, after engine startup, when the $NO_x$ storing catalyst 11 is activated, the air-fuel ratio of the exhaust gas flowing into the $NO_x$ storing catalyst 11 is temporarily switched from lean to the stoichiometric air-fuel ratio or rich immediately so as to make the $NO_x$ absorbent 47 release the $NO_x$.

Further, when increasing the ratio of $NO_2$ from engine startup to when the $NO_x$ storing catalyst 11 becomes activated, it is preferable to make the $NO_x$ absorption amount of the $NO_x$ absorbent 47 zero at the time of engine startup. Accordingly, in this embodiment of the present invention, when operation of the engine is stopped, $NO_x$ is made to be released from the $NO_x$ absorbent 47 by temporarily switching the air-fuel ratio of the exhaust gas flowing to the $NO_x$ storing catalyst 11 from lean to the stoichiometric air-fuel ratio or rich.

On the other hand, the exhaust gas also contains $SO_2$. This $SO_2$ is oxidized by the platinum Pt 46 to become $SO_3$. Next, this $SO_3$ is absorbed in the $NO_x$ absorbent 47 and bonds with the barium oxide BaO while being dispersed in the $NO_x$ absorbent 47 in the form of sulfuric acid ions $SO_4^{2-}$ and produces the stable sulfate $BaSO_4$. However, the $NO_x$ absorbent 47 has a strong basicity, so this sulfate $BaSO_4$ becomes stable and hard to disperse. With just making the air-fuel ratio of the exhaust gas rich, the sulfate $BaSO_4$ remains without being decomposed. Accordingly, the sulfate $BaSO_4$ increases in the $NO_x$ absorbent 47 along with the elapse of time and therefore the amount of $NO_x$ which the $NO_x$ absorbent 47 can absorb falls along with the elapse of time.

However, if making the air-fuel ratio of the exhaust gas rich in the state raising the temperature of the $NO_x$ storing catalyst 11 to more than 600° C., $SO_x$ is released from the $NO_x$ absorbent 47. Therefore, in the embodiment according to the present invention, when the amount of $SO_x$ absorbed in the $NO_x$ absorbent 47 increases, the temperature of the $NO_x$ storing catalyst 11 is raised to over 600° C. so as to make the air-fuel ratio of the exhaust gas rich. FIG. 4 shows an example of the method of raising the temperature TC of the $NO_x$ storing catalyst 11 to over 600° C.

One method effective for raising the temperature TC of the $NO_x$ storing catalyst 11 is the method of delaying the fuel injection timing to after compression top dead center. That is, usually, the main fuel Qm is injected near compression top dead center as shown in (I) in FIG. 4. In this case, if the injection timing of the main fuel Qm is delayed as shown in (II) of FIG. 4, the after burning period becomes longer and therefore the exhaust gas temperature rises. If the exhaust gas temperature rises, the temperature TC of the $NO_x$ storing catalyst 11 rises along with this.

Further, to raise the temperature TC of the $NO_x$ storing catalyst 11, it is also possible to inject auxiliary fuel QV near suction top dead center in addition to the main fuel Qm as shown in (III) of FIG. 4. If additionally injecting auxiliary fuel Qv in this way, the fuel to be burned increases by exactly the auxiliary fuel Qv, so the exhaust gas temperature rises and therefore the temperature TC of the $NO_x$ storing catalyst 11 rises.

On the other hand, if injecting auxiliary fuel Qv near suction top dead center in this way, due to the heat of compression during the compression stroke, aldehydes, ketones, peroxides, carbon monoxide, and other intermediate products are produced from the auxiliary fuel Qv. These intermediate products accelerate the reaction of the main fuel Qm. Therefore, in this case, as shown in (III) of FIG. 4, even if the injection timing of the main fuel Qm is greatly delayed, good combustion can be obtained without causing misfires. That is, it is possible to greatly delay the injection timing of the main fuel Qm, so the exhaust gas temperature becomes considerably high and accordingly the temperature TC of the $NO_x$ storing catalyst 11 can be quickly raised.

Further, to raise the temperature TC of the $NO_x$ storing catalyst 11, it is possible to inject auxiliary fuel Qp during the expansion stroke or the exhaust stroke in addition to the main fuel Qm as shown in (IV) of FIG. 4. That is, in this case, the majority of the auxiliary fuel Qp is exhausted to the inside of the exhaust passage in the form of unburned HC without being burned. This unburned HC is oxidized by the surplus oxygen on the $NO_x$ storing catalyst 11. The heat of the oxidation reaction produced at this time causes the temperature TC of the $NO_x$ storing catalyst 11 to rise.

Now, in the first embodiment according to the present invention, when the temperature TC of the $NO_x$ storing catalyst 11 exceeds the temperature setting Ts, that is, when the $NO_x$ storing catalyst 11 is activated, the amount of absorbed $NO_x$ absorbed in the $NO_x$ absorbent 47 of the $NO_x$ storing catalyst 11 is calculated. When the calculated amount of absorbed $NO_x$ exceeds a predetermined allowable value, the air-fuel ratio of the exhaust gas is switched from lean to rich, whereby $NO_x$ is released from the $NO_x$ absorbent 47.

Figure 5A:
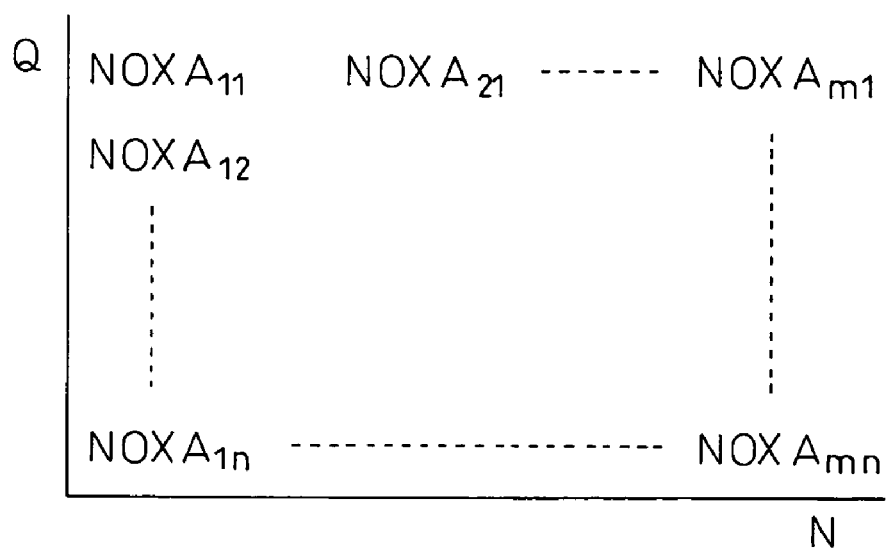
FIGS. 5A and 5B are views for explaining the $NO_x$ absorption amount per unit time.

The amount of the $NO_x$ exhausted from the engine per unit time is a function of the fuel injection amount Q and the engine speed N. Therefore, the $NO_x$ absorption amount NOXA absorbed in the $NO_x$ absorbent 47 per unit time becomes a function of the fuel injection amount Q and the engine speed N. In this embodiment, the $NO_x$ absorption amount per unit time in accordance with the fuel injection amount Q and engine speed N is found in advance by experiments. This $NO_x$ absorption amount NOXA is stored as a function of the fuel injection amount Q and the engine speed N as shown in FIG. 5A in the form of a map in advance in the ROM 32.

Figure 5B:
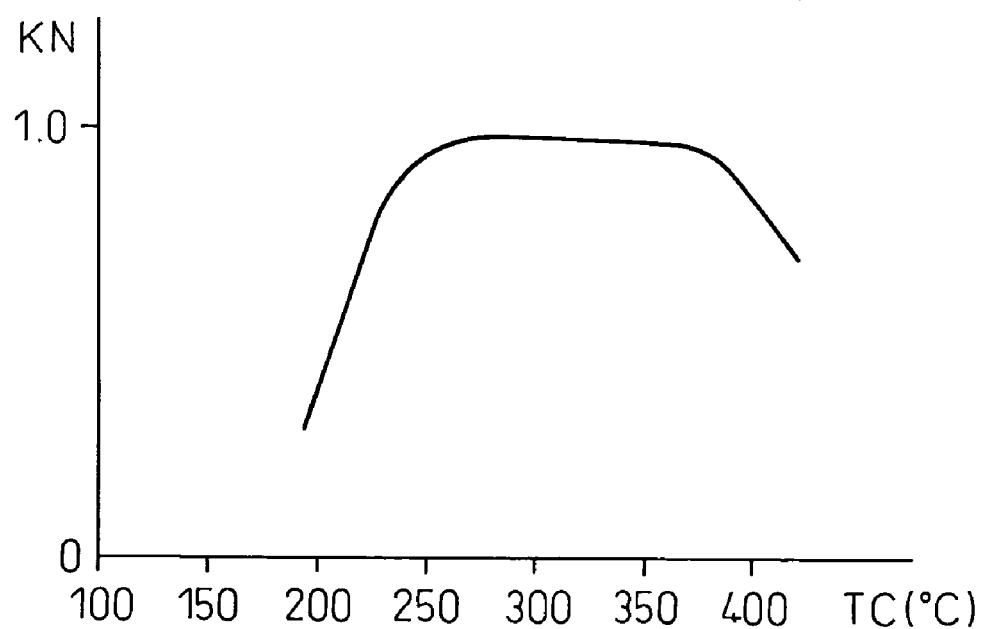

On the other hand, FIG. 5B shows the relationship between the $NO_x$ absorption rate KN to the $NO_x$ absorbent 47 and the temperature TC of the $NO_x$ storing catalyst 11. The $NO_x$ absorption rate KN has the same tendency as the $NO_x$ absorption rate shown in FIG. 3 for the temperature TC of the $NO_x$ storing catalyst 11. The actual $NO_x$ absorption amount to the $NO_x$ absorbent 47 is expressed as a product of NOXA and KN.

Figure 6:
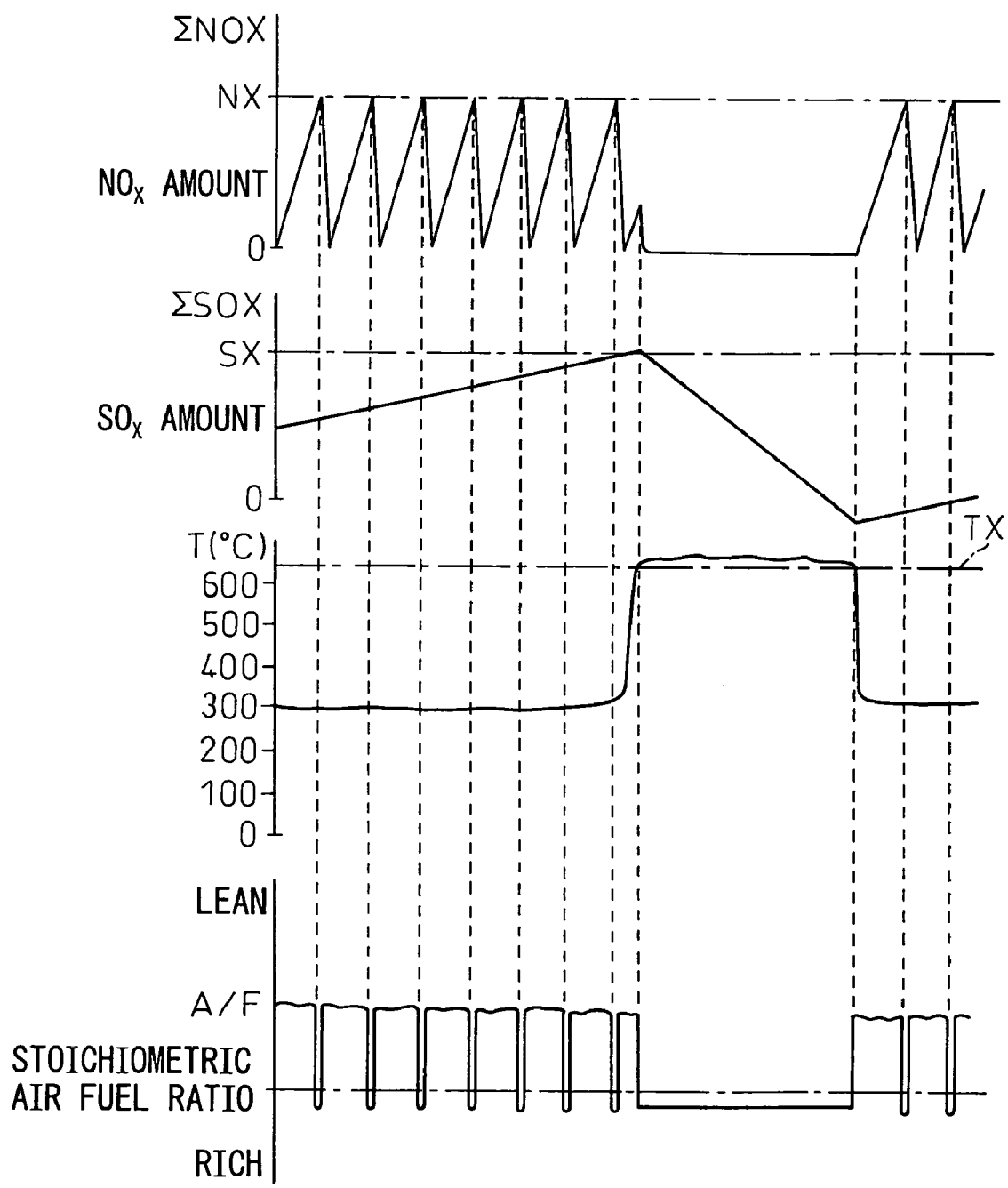
FIG. 6 is a view of a time chart of $NO_x$ and $SO_x$ release control.

FIG. 6 shows the control for release of $NO_x$ and $SO_x$ when the $NO_x$ storing catalyst 11 is activated. As shown in FIG. 6, each time the cumulative value $\Sigma NOX$ of the $NO_x$ absorption amount NOXA·KN exceeds the allowable value NX, reducing agent is supplied from the reducing agent supply valve 13 and the air-fuel ratio A/F of the exhaust gas flowing into the $NO_x$ storing catalyst 11 is temporarily switched from lean to rich. At this time, the $NO_x$ is released from the $NO_x$ absorbent 47 and reduced.

On the other hand, the cumulative value $\Sigma SO_x$ of the amount of $SO_x$ absorbed in the $NO_x$ absorbent 47 is also calculated. If the cumulative value $\Sigma SOX$ of the amount of $SO_x$ exceeds the allowable value SX, a $SO_x$ release action is performed from the $NO_x$ absorbent 47. That is, first, the temperature TC of the $NO_x$ storing catalyst 11 is raised until reaching the $SO_x$ release temperature TX by the method shown in (II) to (IV) of FIG. 4. This $SO_x$ release temperature TX is at least 600° C.

When the temperature TC of the $NO_x$ storing catalyst 11 reaches the $SO_x$ release temperature TX, the air-fuel ratio of the exhaust gas flowing into the $NO_x$ storing catalyst 11 is switched from lean to rich and the release of $SO_x$ from the $NO_x$ absorbent 47 is started. During control of release of $SO_x$, the temperature TC of the $NO_x$ storing catalyst 11 is held at least at the $SO_x$ release temperature TX and the air-fuel ratio of the exhaust gas is maintained rich or alternately made rich or lean as shown in FIG. 6. Next, when the $SO_x$ release action ends, the temperature raising action of the $NO_x$ storing catalyst 11 is stopped and the air-fuel ratio of the exhaust gas is returned to lean.

Figure 7:
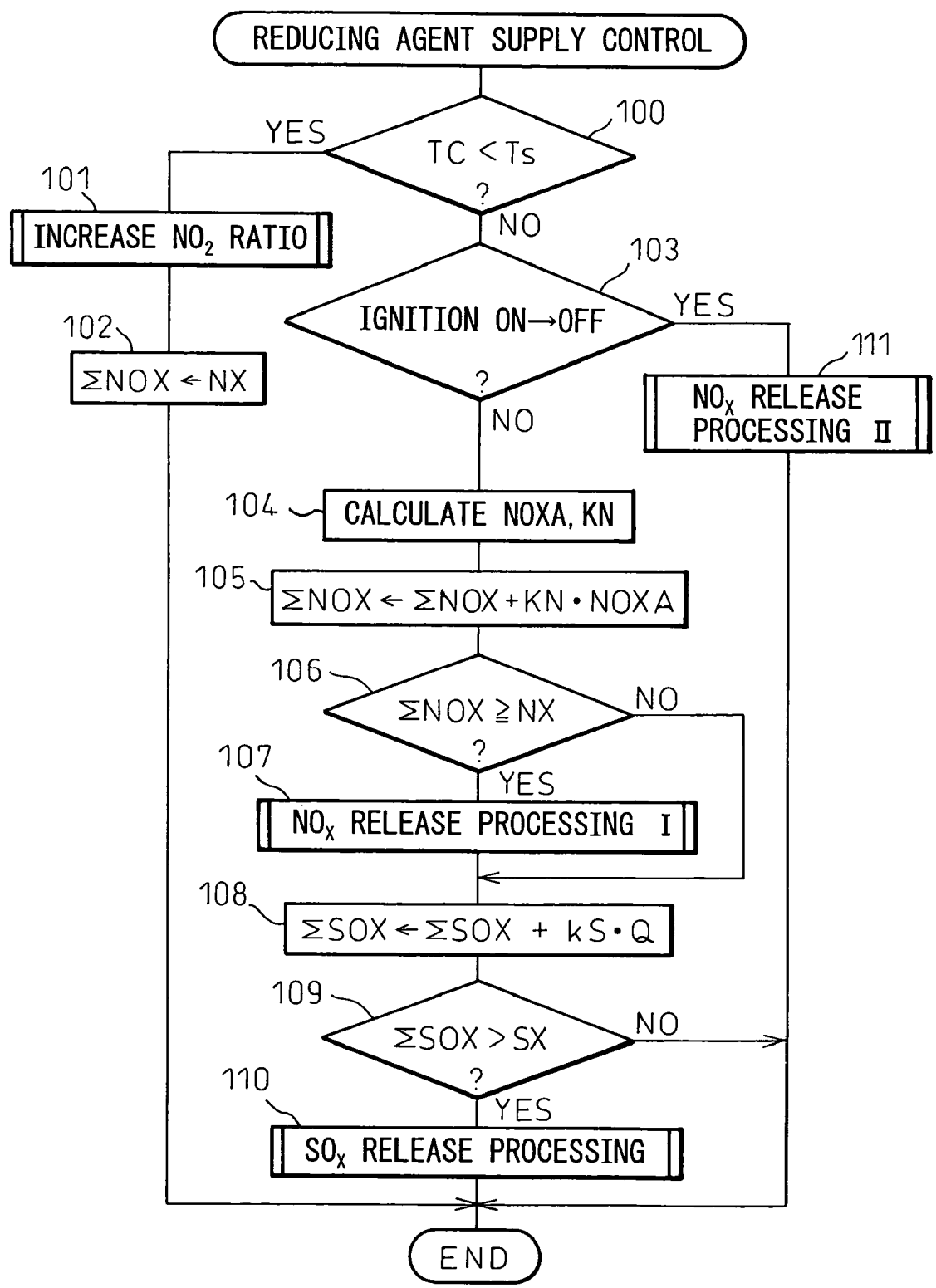
FIG. 7 is a flow chart for reducing agent supply control.

FIG. 7 shows the routine for control of the supply of the reducing agent from the reducing agent supply valve 13. This routine is executed by interruption every certain time period. Referring to FIG. 7, first, at step 100, it is judged if the temperature TC of the $NO_x$ storing catalyst 11 is lower than the temperature setting Ts, for example, 200° C. When TC<Ts, the routine proceeds to step 101, where $NO_2$ ratio increase processing is performed for increasing the ratio of $NO_2$ in the exhaust gas (amount of $NO_2$/amount of NO). In this embodiment of the present invention, as explained above, the ratio of the $NO_2$ in the exhaust gas is increased by at least one of delay of the fuel injection timing, increase of the amount of EGR gas, pilot injection, or premix combustion. By increasing the ratio of the $NO_2$ in the exhaust gas in this way, the majority of the $NO_x$ contained in the exhaust gas can be stored in the $NO_x$ storing catalyst 11 and therefore even in the interval after engine startup until the $NO_x$ storing catalyst 11 is activated, the release of a large amount of $NO_x$ into the atmosphere can be prevented.

Next, at step 102, when the temperature TC of the $NO_x$ storing catalyst 11 exceeds the temperature setting Ts, the cumulative value $\Sigma NOX$ of the $NO_x$ absorption amount is made the allowable value NX for the $NO_x$ release processing for releasing the $NO_x$ from the $NO_x$ absorbent 47 immediately.

On the other hand, when it is judged at step 100 that $TC \geq Ts$, that is, when it is judged that the $NO_x$ storing catalyst 11 has become activated, the routine proceeds to step 103, where it is judged if the ignition switch 43 has been switched from on to off to stop the engine. When the ignition switch 43 is still on, the routine proceeds to step 104, where the $NO_x$ absorption amount NOXA per unit time and the $NO_x$ absorption rate KN shown in FIG. 5B are calculated from the map shown in FIG. 5A. Next, at step 105, the actual $NO_x$ absorption amount KN·NOXA is added to $\Sigma NOX$ so as to calculate the cumulative value $\Sigma NOX$ of the amount of $NO_x$ absorption. Next, at step 106, it is judged if the cumulative value $\Sigma NOX$ of the amount of $NO_x$ absorption has exceeded the allowable value NX. When $\Sigma NOX < NX$, the routine jumps to step 108. As opposed to this, when $\Sigma NOX \leq NX$, the routine proceeds to step 107, where the $NO_x$ release processing I is performed, then the routine proceeds to step 108. As explained above, when $TC \geq Ts$, the cumulative value $\Sigma NOX$ of the amount of $NO_x$ absorption is made the allowable value NX. Therefore, at this time, the routine proceeds to step 107, where the $NO_x$ release processing I is performed.

At step 108, the value kS·Q of the fuel injection amount Q multiplied by the constant kS is added to $\Sigma SOX$. As explained above, fuel contains a certain amount of sulfur. Therefore, the amount of $SO_x$ absorbed in the $NO_x$ absorbent 47 of the $NO_x$ storing catalyst 11 per unit time can be expressed by k·SQ. Accordingly, the $\Sigma SOX$ obtained by adding to the $\Sigma SOX$ to k·SQ expresses the cumulative value of the amount of $SO_x$ absorbed in the $NO_x$ absorbent 47. Next, at step 109, it is judged if the cumulative value $\Sigma SOX$ of the amount of $SO_x$ exceeds the allowable value SX. When $\Sigma SOX \leq Sx$, the processing cycle is ended, while when $\Sigma SOX > SX$, the routine proceeds to step 110, where the $SO_x$ release processing is performed.

On the other hand, when it is judged at step 103 that the ignition switch 43 has been switched from on to off, the routine proceeds to step 111, where $NO_X$ release processing II is performed for making the $NO_X$ amount absorbed in the NOX absorbent 4 zero.

Figure 8:
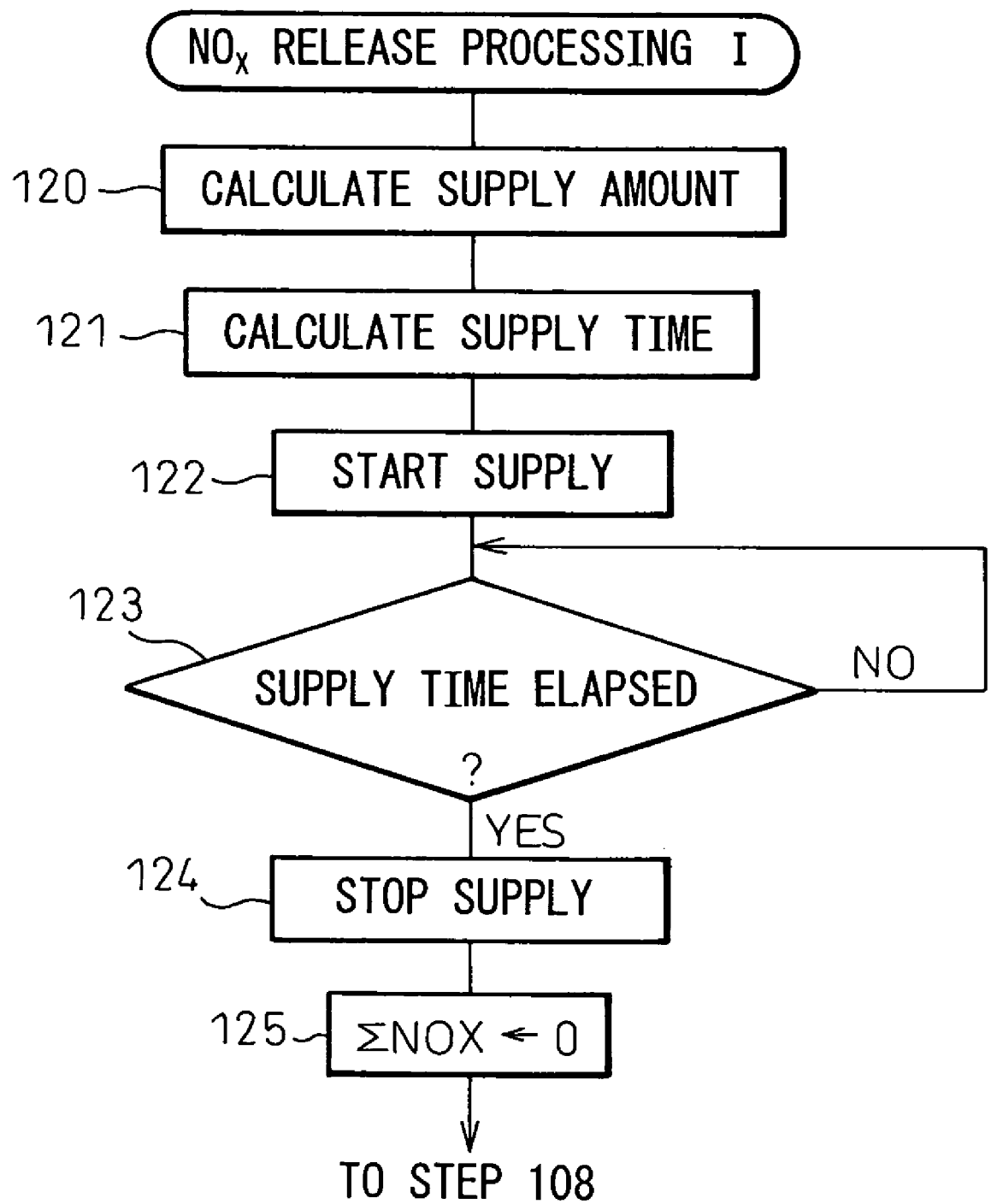
FIG. 8 is a flow chart for $NO_x$ release processing I.

FIG. 8 shows the processing routine of the $NO_X$ release processing I executed at step 10 of FIG. 7. Referring to FIG. 8, first, at step 120, the amount of supply of the reducing agent required for making the air-fuel ratio of the exhaust gas a rich air-fuel ratio of about 13 is calculated. Next, at step 121, the supply time of the reducing agent is calculated. The supply time of the reducing agent is normally not more than 10 seconds. Next, at step 123, it is judged if the supply time of the reducing agent calculated at step 121 has elapsed. When the supply time of the reducing agent has not elapsed, the routine returns to step 123. At this time, the supply of the reducing agent is continued and the air-fuel ratio of the exhaust gas is maintained at a rich air-fuel ratio of about 13. As opposed to this, when the supply time of the reducing agent has elapsed, that is, when the $NO_x$ release action from the $NO_x$ absorbent 47 has been completed, the routine proceeds to step 124, where the supply of the reducing agent is stopped, then the routine proceeds to step 125, where the $\Sigma NOX$ is cleared. Next, the routine proceeds to step 108 of FIG. 7.

Figure 9:
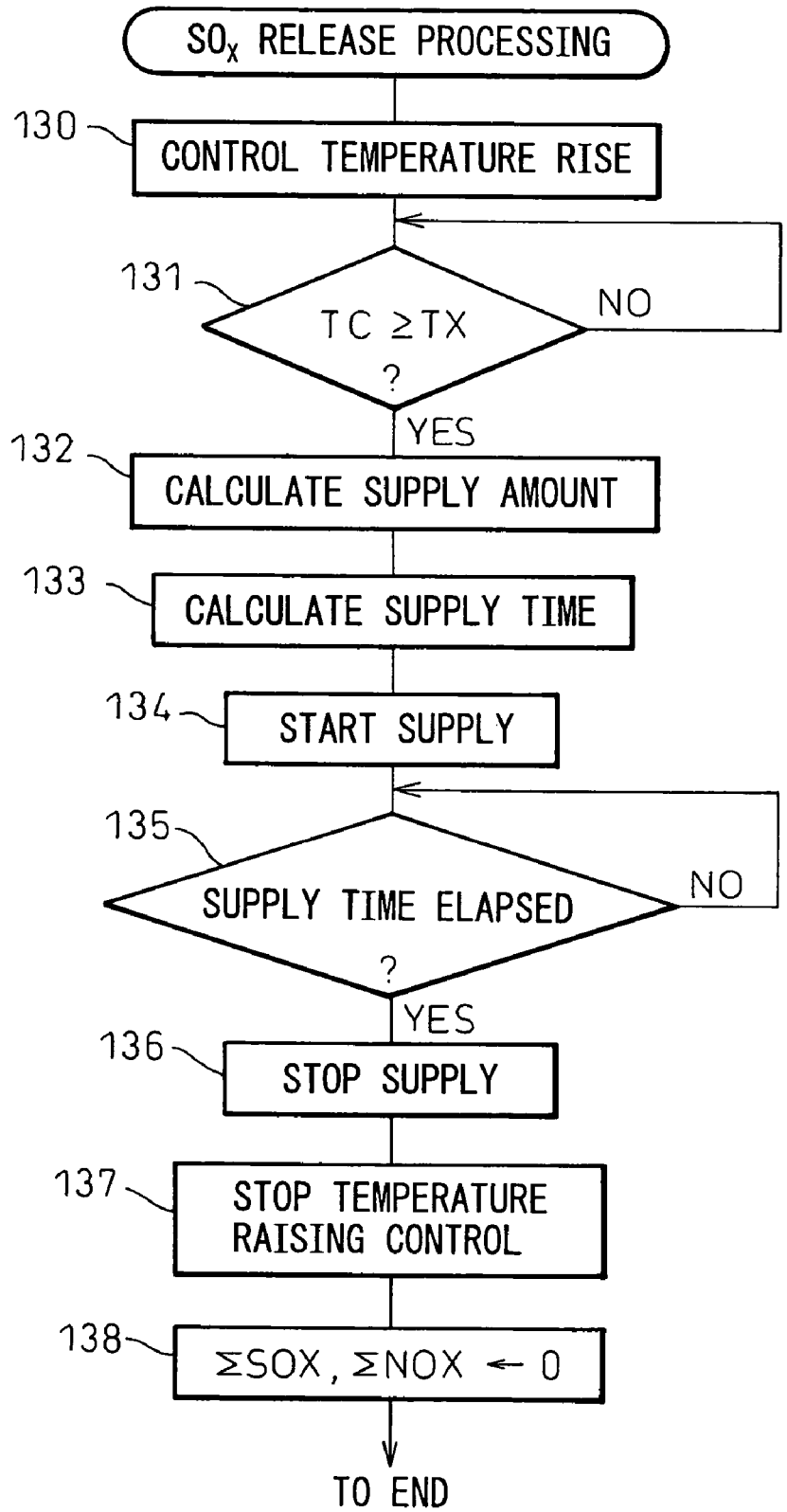
FIG. 9 is a flow chart for $SO_x$ release processing.

FIG. 9 shows the processing routine of the SOX release processing executed at step 110 of FIG. 7. Referring to FIG. 9, first, at step 130, control for raising the temperature of the $NO_x$ storing catalyst 11 is performed. That is, the fuel injection pattern from the fuel injector 3 is changed to any injection pattern shown in (II) to (IV) of FIG. 4. When the fuel injection pattern is changed to any injection pattern from (II) to (IV) of FIG. 4, the exhaust gas temperature rises and therefore the temperature of the $NO_x$ storing catalyst 11 rises. Next, the routine proceeds to step 131, where it is judged if the temperature TC of the $NO_x$ storing catalyst 11 has become more than the $SO_x$ release temperature TX. When TC<TX, the routine returns to step 131. As opposed to this, when $TC \geq TX$, the routine proceeds to step 132, where the amount of supply of the reducing agent required for making the air-fuel ratio of the exhaust gas a rich air-fuel ratio of about 14 is calculated. Next, at step 133, the supply time of the reducing agent is calculated. The supply time of the reducing agent is about 10 minutes. Next, at step 134, the supply of the reducing agent from the reducing agent supply valve 13 is started. Next, at step 135, it is judged if the supply time of the reducing agent calculated at step 133 has elapsed. When the supply time of the reducing agent has not elapsed, the routine returns to step 135. At this time, the supply of the reducing agent is continued and the air-fuel ratio of the exhaust gas is maintained at a rich air-fuel ratio of about 14. As opposed to this, when the supply time of the reducing agent has elapsed, that is, when the release of the $SO_x$ absorbed in the $NO_x$ absorbent 47 has been completed, the routine proceeds to step 136, where the supply of the reducing agent is stopped. Next, at step 137, the temperature raising action of the $NO_x$ storing catalyst 11 is stopped, then the routine proceeds to step 138, where the $\Sigma SOX$ and $\Sigma NOX$ are cleared.

Figure 10:
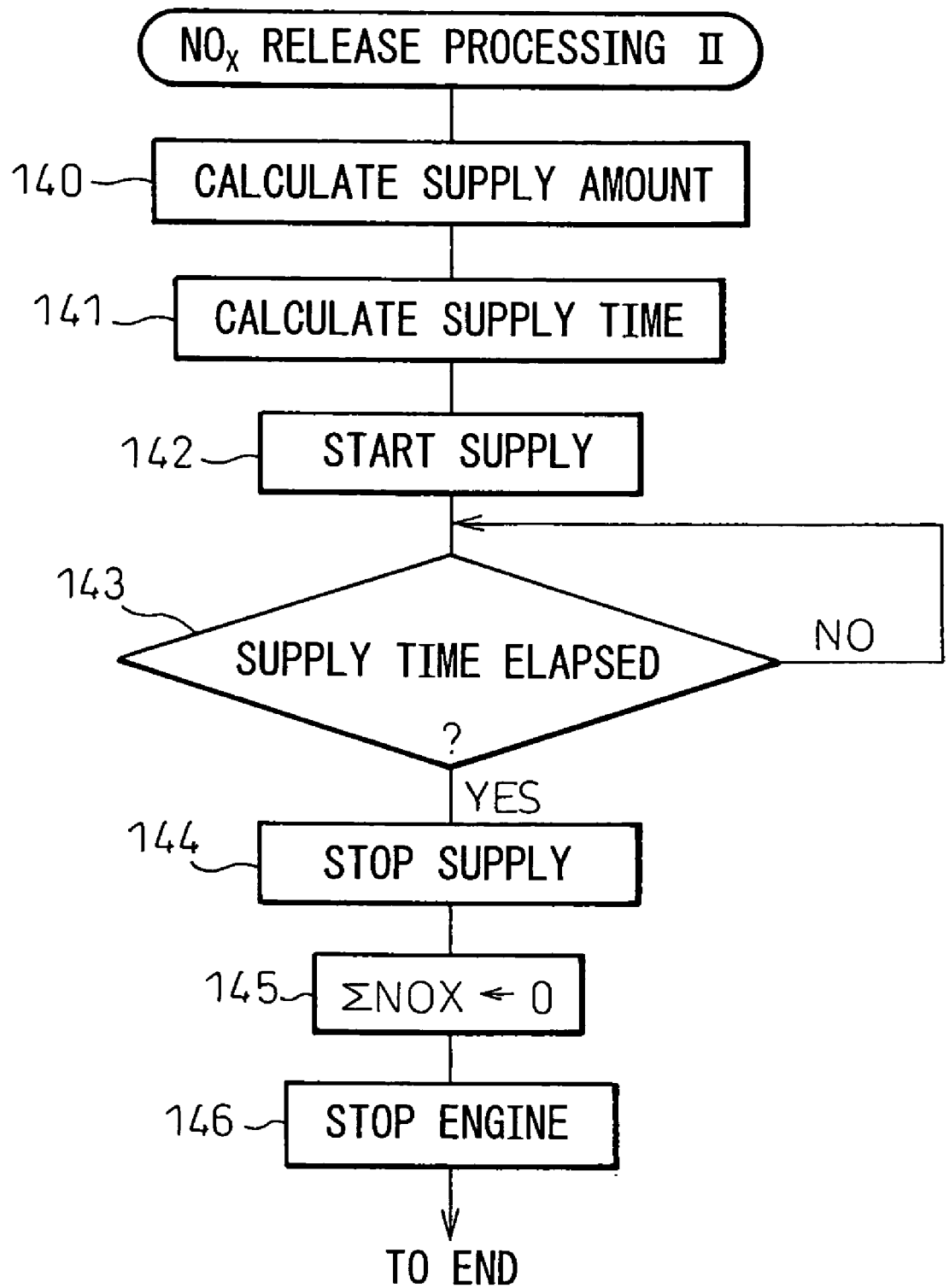
FIG. 10 is a flow chart for $NO_x$ release processing II.

FIG. 10 shows the processing routine of the $NO_x$ release processing II executed at step 111 of FIG. 7. Referring to FIG. 10, first, at step 140, the supply of reducing agent required for making the air-fuel ratio of the exhaust gas a rich air-fuel ratio of about 13 is calculated. Next, at step 141, the supply time of the reducing agent is calculated. The supply time of the reducing agent is usually not more than 10 seconds. Next, at step 142, the supply of the reducing agent from the reducing agent supply valve 13 is started. Next, at step 143, it is judged if the supply time of the reducing agent calculated at step 141 has elapsed or not. When the supply time of the reducing agent has not elapsed, the routine returns to step 143. At this time, the supply of the reducing agent is continued and the air-fuel ratio of the exhaust gas is maintained at a rich air-fuel ratio of about 13. As opposed to this, when the supply time of the reducing agent has elapsed, that is, when the $NO_x$ releasing action from the $NO_x$ absorbent 47 is completed, the routine proceeds to step 144, where the supply of the reducing agent is stopped, then the routine proceeds to step 145, where the $\Sigma NOX$ is cleared. Next, at step 146, processing is performed for stopping the engine.

Figure 11:
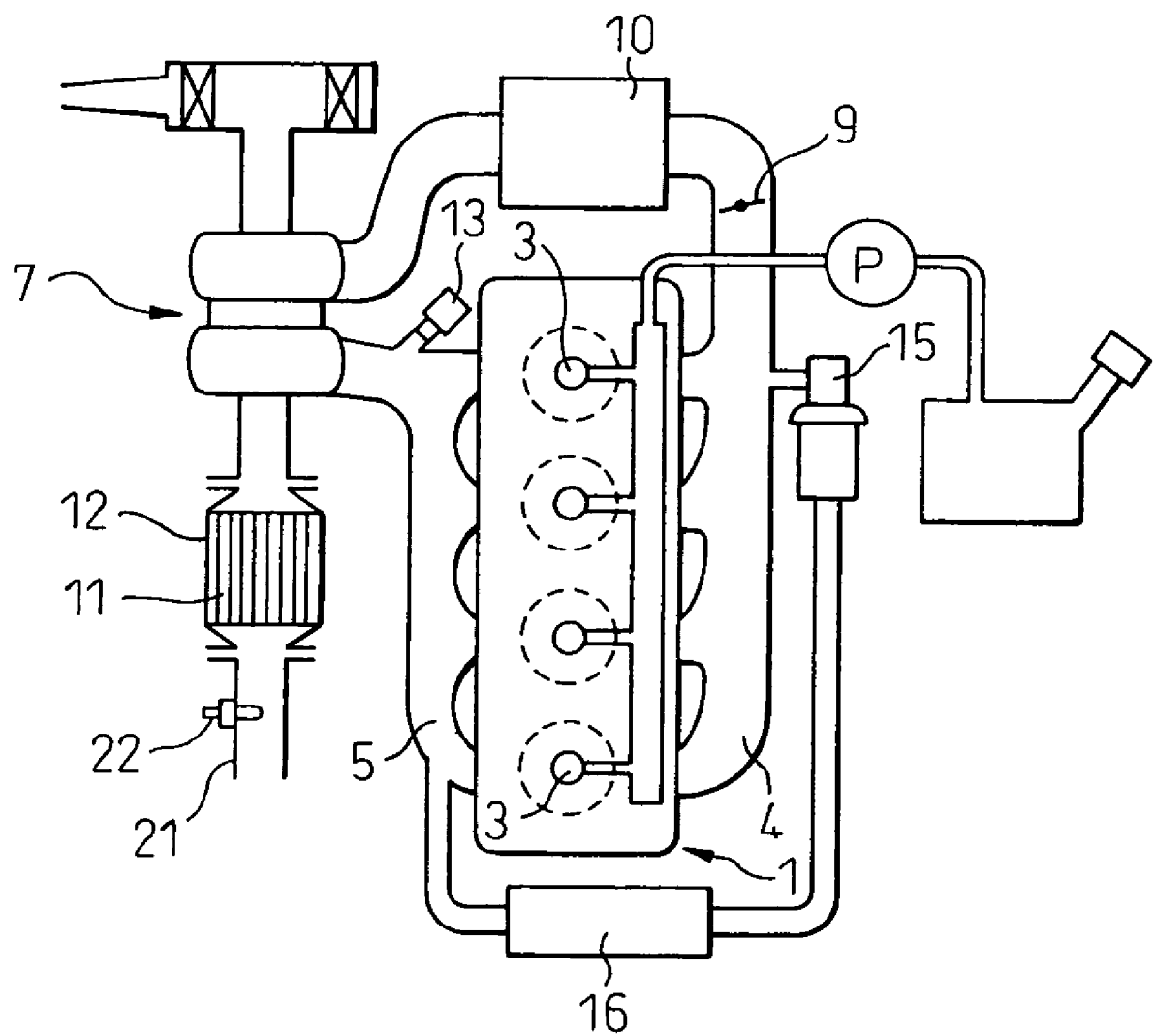
FIG. 11 is an overview of another embodiment of a compression ignition type internal combustion engine.
Figure 12A:
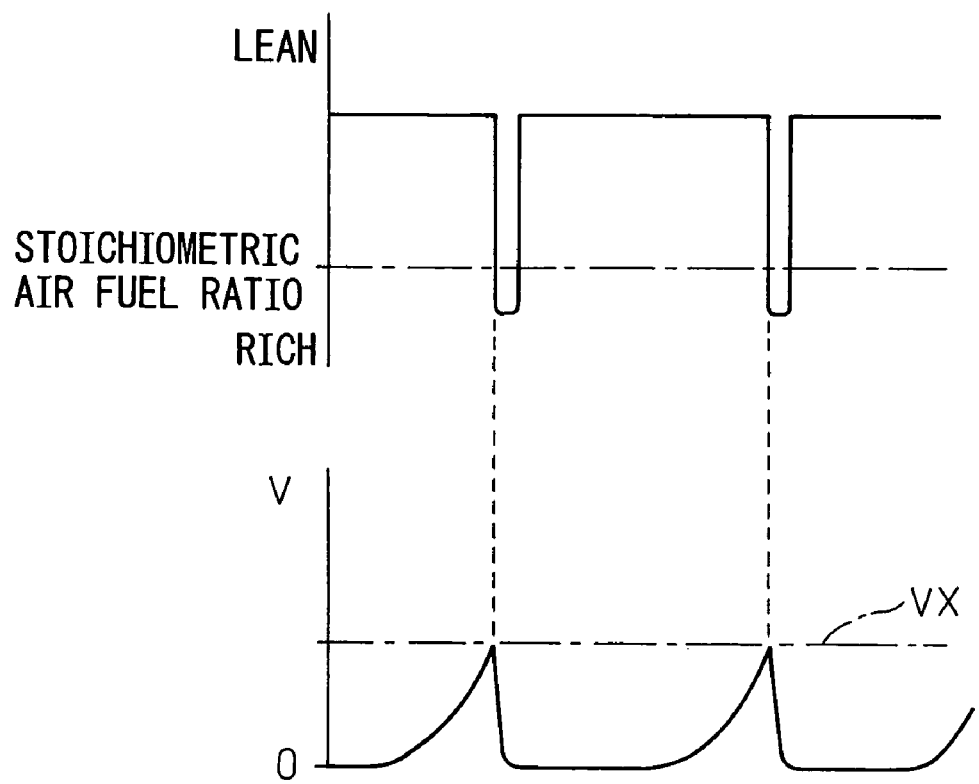
FIGS. 12A and 12B are views for explaining changes in $NO_x$ concentration in exhaust gas and air-fuel ratio control of exhaust gas.
Figure 12B:
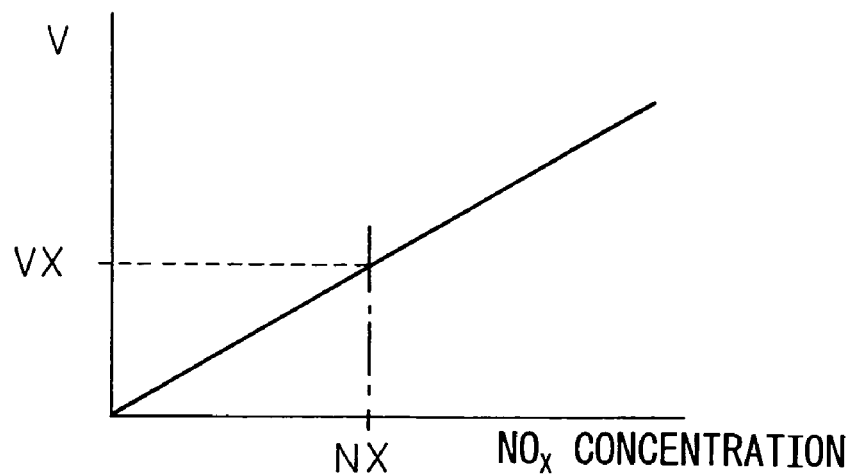
Figure 13:
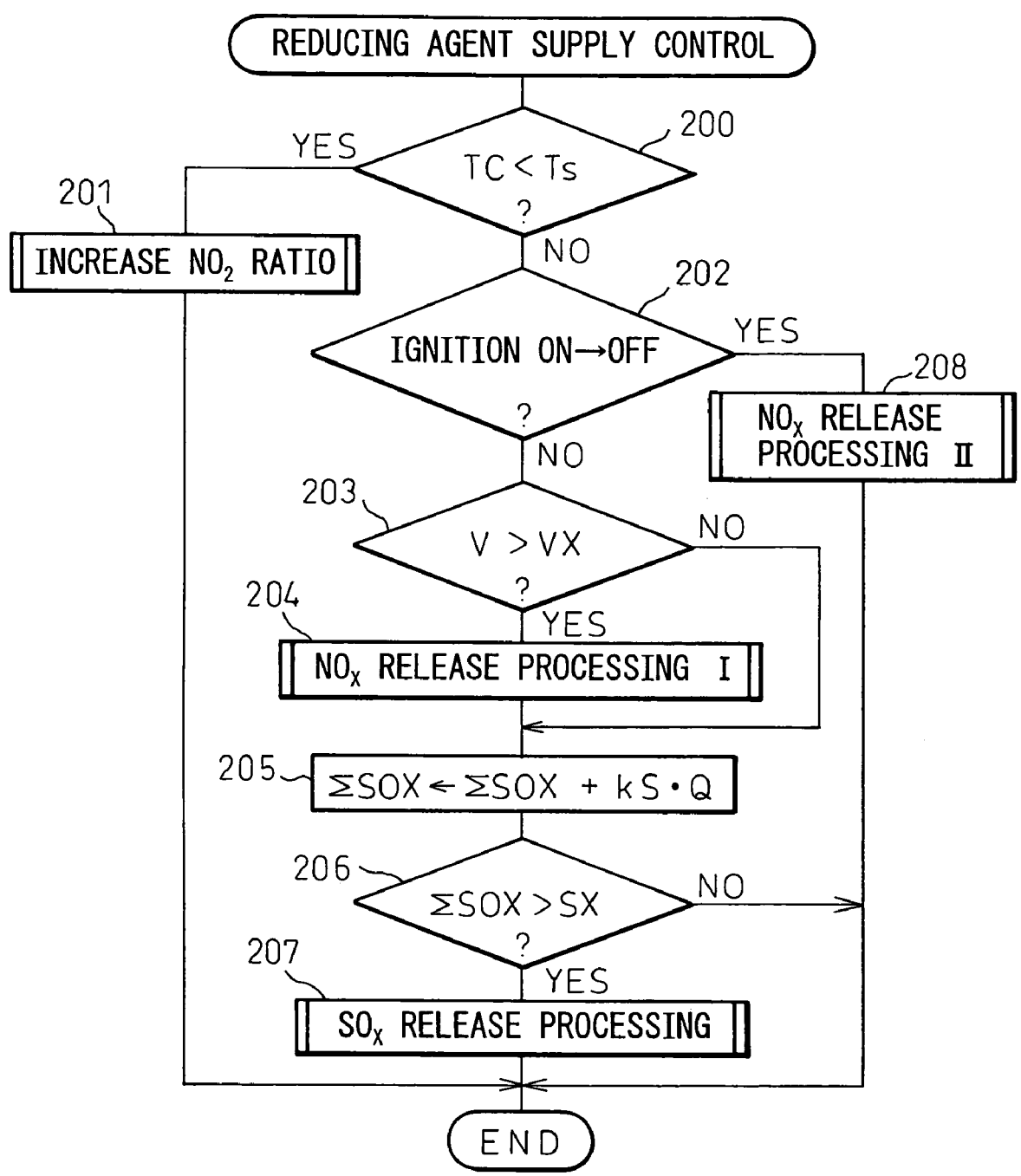
FIG. 13 is a flow chart for reducing agent supply control.

FIG. 11 to FIG. 13 show a second embodiment. In the second embodiment, as shown in FIG. 11, a $NO_x$ concentration sensor 22 able to detecting the $NO_x$ concentration in the exhaust gas is arranged in the exhaust pipe 21 attached to the outlet of the casing 12 housing the $NO_x$ storing catalyst 11 as shown in FIG. 11. This $NO_x$ concentration sensor 22 generates an output voltage V proportional to the $NO_x$ concentration as shown in FIG. 12B.

At the $NO_x$ storing catalyst 11, when the $NO_x$ absorption amount of the $NO_x$ absorbent 47 becomes close to saturation, the purification rate of the $NO_x$ gradually falls and as a result the $NO_x$ concentration in the exhaust gas gradually increases. Therefore, the amount of absorbed $NO_x$ of the $NO_x$ absorbent 47 can be estimated from the $NO_x$ concentration in the exhaust gas. In this embodiment, when the amount of absorbed $NO_x$ estimated from the $NO_x$ concentration in the exhaust gas exceeds a predetermined allowable value, that is, as shown in FIG. 12A when the output voltage V of the $NO_x$ concentration sensor 22 exceeds the set value VX, the air-fuel ratio of the exhaust gas is switched from lean to rich.

FIG. 13 shows the routine for control of the supply of the reducing agent from the reducing agent supply valve 13 in this embodiment. This routine is executed by interruption every constant time period. Referring to FIG. 13, first, at step 200, it is judged if the temperature TC of the $NO_x$ storing catalyst 11 is lower than the temperature setting TS, for example, 200° C. When TC<Ts, the routine proceeds to step 201, where the $NO_2$ ratio increase processing is performed for increasing the ratio of the $NO_2$ in the exhaust gas (amount of $NO_2$/amount of NO). In this embodiment of the present invention, as explained above, the ratio of the $NO_2$ in the exhaust gas is increased by at least one of delay of the fuel injection timing, increase of the amount of EGR gas, pilot injection, or premix combustion.

On the other hand, when it is judged that TC≧Ts at step 200, that is, when it is judged that the $NO_x$ storing catalyst 11 has been activated, the routine proceeds to step 202, where it is judged if the ignition switch 43 has been switched from on to off to stop the engine. When the ignition switch 43 is still in the on position, the routine proceeds to step 203, where it is judged if the output voltage V of the $NO_x$ concentration sensor 22 exceeds the set value VX. When V≦VX, the routine jumps to step 205. As opposed to this, when V>VX, the routine proceeds to step 204, where the $NO_x$ release processing I shown in FIG. 8 is executed. Next, the routine proceeds to step 205.

At step 205, the value kS·Q of the fuel injection amount Q multiplied by the constant kS is added to ΣSOX. As explained above, fuel contains a certain amount of sulfur. Therefore, the amount of $SO_x$ absorbed in the $NO_x$ absorbent 47 of the $NO_x$ storing catalyst 11 per unit time can be expressed by kS·Q. Therefore, the ΣSOX obtained by adding ΣSOX to kS·Q expresses the cumulative value of the amount of $SO_x$ absorbed in the $NO_x$ absorbent 47. Next, at step 206, it is judged if the cumulative value ΣSOX of the amount of $SO_x$ has exceeded the allowable value SX. When ΣSOX≦SX, the processing cycle is ended, while when ΣSOX>SX, the routine proceeds to step 207, where the $SO_x$ release processing shown in FIG. 9 is performed.

On the other hand, when it is judged at step 202 that the ignition switch 43 has been switched from on to off, the routine proceeds to step 208, where the $NO_x$ release processing II shown in FIG. 10 is executed to make the $NO_x$ amount absorbed in the $NO_x$ absorbent 47 zero.

Figure 14A:
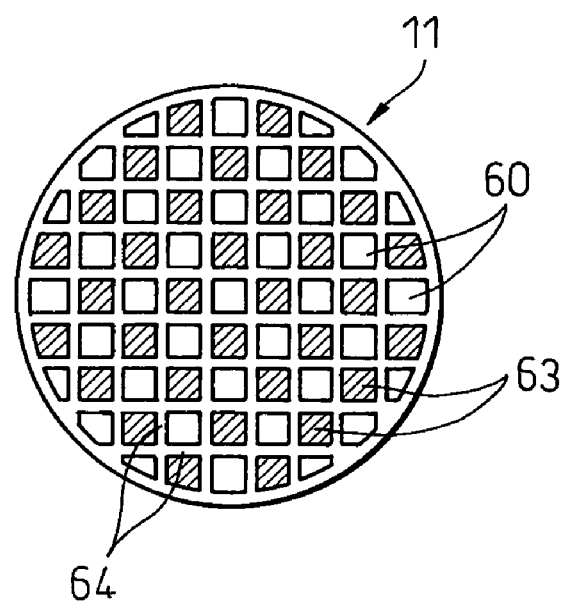
FIGS. 14A and 14B are views of a particulate filter.
Figure 14B:
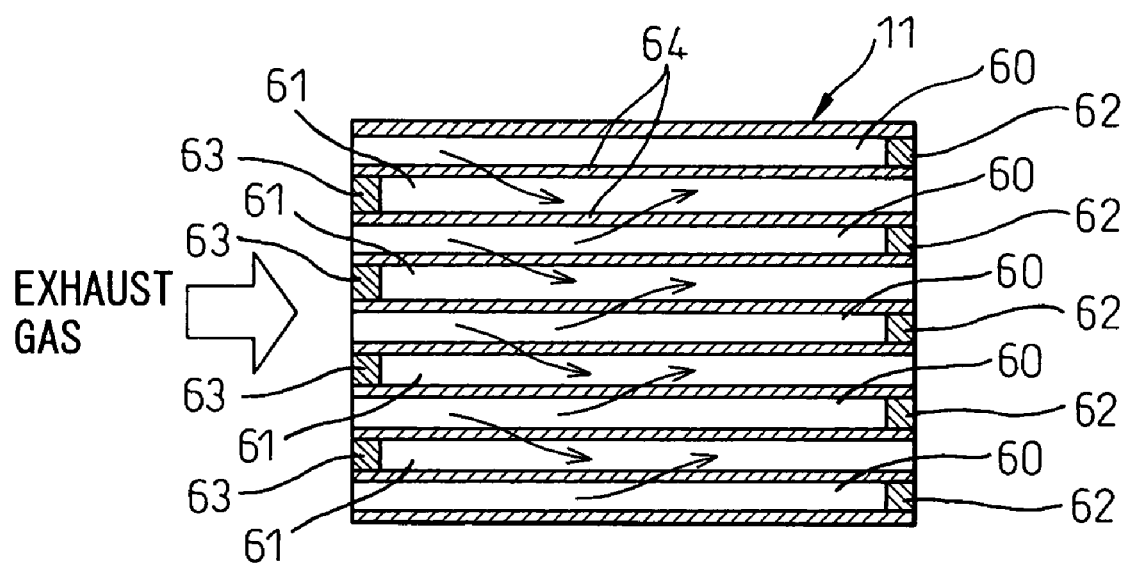

Next, the case of the $NO_x$ storing catalyst 11 shown in FIG. 1 and FIG. 11 being made of a particulate filter will be explained. FIGS. 14A and 14B show the structure of this particulate filter 11. Note that FIG. 14A is a front view of the particulate filter 11, while FIG. 14B is a side sectional view of the particulate filter 11. As shown in FIGS. 14A and 14B, the particulate filter 11 has a honeycomb structure and is provided with a plurality of exhaust gas flow passages 60 and 61 extending in parallel with each other. These exhaust flow passages are comprised of exhaust gas inflow passages 60 blocked at their downstream ends by plugs 62 and exhaust gas outflow passages 61 blocked at their upstream ends by plugs 63. Note that in FIG. 14A, the hatched portions show the plugs 63. Therefore, the exhaust gas inflow passages 60 and the exhaust gas outflow passages 61 are alternately arranged through thin partitions 64. In other words, the exhaust gas inflow passages 60 and the exhaust gas outflow passages 61 are arranged so that each exhaust gas inflow passage 60 is surrounded by four exhaust gas outflow passages 61 and each exhaust gas outflow passage 61 is surrounded by four exhaust gas inflow passages 60.

The particulate filter 11 is formed from a porous material such as cordierite. Therefore, the exhaust gas flowing into the exhaust gas inflow passages 60 flows out through the surrounding partitions 64 to the insides of the adjoining exhaust gas outflow passages 61 as shown by the arrows in FIG. 14B.

When making the $NO_x$ storing catalyst from a particulate filter in this way, a layer of a catalyst carrier comprised of alumina is formed on the peripheral walls of the exhaust gas inflow passages 60 and the exhaust gas outflow passages 61, that is, the two side surfaces of the partitions 64 and the inside wall surfaces of the pores of the partitions 64. As shown in FIGS. 2A and 2B, the precious metal catalyst 46 and the $NO_x$ absorbent 47 are carried on the catalyst carrier 45. Note that in this case as well, platinum Pt is used as the precious metal catalyst. In this way, even when making the $NO_x$ storing catalyst from a particulate filter, the $NO_2$ in the exhaust gas is stored in the $NO_x$ storing catalyst when the $NO_x$ storing catalyst is not activated. Note that in this case as well, $NO_x$ and SOX release control is performed in the same way as the $NO_x$ and $SO_x$ release control for the $NO_x$ storing catalyst 11 shown from FIG. 7 to FIG. 11.

Further, when making the $NO_x$ storing catalyst from a particulate filter, the particulate contained in the exhaust gas is trapped in the particulate filter 11. The trapped particulate is successively burned by the heat of the exhaust gas. If a large amount of particulate deposits on the particulate filter 11, the injection pattern is switched to any one of the injection patterns (II) to (IV) of FIG. 4 or reducing agent is supplied from the reducing agent supply valve 13, whereby the exhaust gas temperature is raised and the deposited particulate is ignited and burned.

Figure 15:
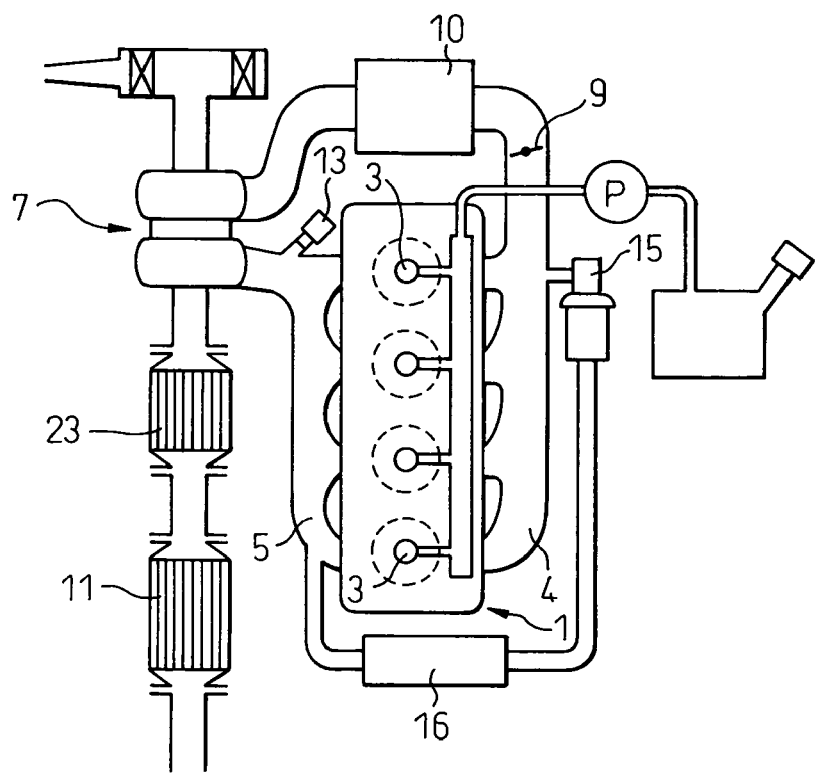
FIG. 15 is an overview of still another embodiment of a compression ignition type internal combustion engine.

FIG. 15 shows another embodiment. In this embodiment, an oxidization catalyst 23 carrying a precious metal catalyst such as platinum Pt is arranged in the engine exhaust passage upstream of the $NO_x$ storing catalyst 11. This oxidation catalyst 23 does not carry a strongly basic $NO_x$ absorbent, so has a strong oxidation ability. Therefore, the oxidation action of nitrogen monoxide NO by the oxidation catalyst 23 is started from before the $NO_x$ storing catalyst 11 becomes active. That is, in this embodiment, the oxidation action of oxidizing the nitrogen monoxide NO into nitrogen dioxide $NO_2$ by the oxidation catalyst 23 before the $NO_x$ storing catalyst 11 becomes active. Therefore, in this embodiment, there is the advantage that the ratio of the $NO_2$ in the exhaust gas flowing into the $NO_x$ storing catalyst 11 can be raised.

Figure 16:
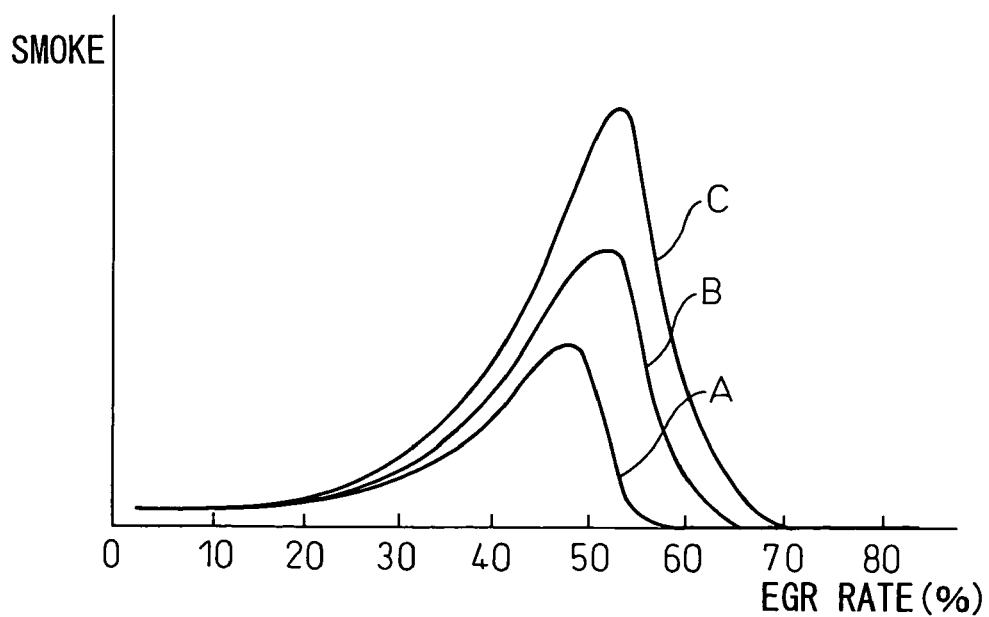
FIG. 16 is a view of the amount of generation of smoke.

Next, the low temperature combustion method suitable for raising the $NO_x$ storing catalyst 11 and making the air-fuel ratio of the exhaust gas rich will be explained. In compression ignition type internal combustion engines shown in FIG. 1, FIG. 11, and FIG. 15, when the EGR rate (amount of EGR gas/(amount of EGR gas+amount of intake air)) increases, the amount of production of smoke gradually increases and then peaks. When further raising the EGR rate, this time the amount of production of smoke rapidly falls. This will be explained with reference to FIG. 16 showing the relationship between the EGR rate and the smoke when changing the degree of cooling of the EGR gas. Note that in FIG. 16, curve A shows the case of force cooling the EGR gas to maintain the EGR gas temperature at about 90° C., curve B shows the case of cooling the EGR gas by a small sized cooling device, and curve C shows the case of not force cooling the EGR gas.

As shown by the curve A of FIG. 16, when force cooling the EGR gas, the amount of production of smoke peaks when the EGR rate becomes slightly lower than 50 percent. In this case, if the EGR rate is made at least about 55 percent, almost no smoke will be produced any longer. On the other hand, as shown by the curve B of FIG. 16, when cooling the EGR gas a little, the amount of production of smoke peaks when the EGR rate becomes slightly higher than 50 percent. In this case, if the EGR rate is made at least about 65 percent, almost no smoke will be produced any longer. Further, as shown by the curve C of FIG. 16, if not force cooling the EGR gas, the amount of production of smoke peaks when the EGR rate is near 55 percent. In this case, if the EGR rate is made at least about 70 percent, almost no smoke will be produced any longer.

Almost no smoke will be produced any longer if making the EGR gas rate at least 55 percent in this way because the fuel and surrounding gas temperature at the time of combustion will not become that high due to the heat absorbing action of the EGR gas, that is, low temperature combustion will be performed, and as a result the hydrocarbons will not grow into soot.

This low temperature combustion has the feature of being able to suppress the production of smoke regardless of the air-fuel ratio while reducing the amount of production of $NO_x$. That is, if the air-fuel ratio is made rich, the fuel will become excessive, but the combustion temperature is suppressed to a low temperature, so the excessive fuel will not grow into soot and therefore smoke will not be produced. Further, at this time, only a very small amount of $NO_x$ will be produced. On the other hand, when the average air-fuel ratio is lean or when the air-fuel ratio is the stoichiometric air-fuel ratio, the higher the combustion temperature, the smaller the amount of soot produced, but under low temperature combustion, the combustion temperature is suppressed to a low temperature, so almost no smoke is produced and only a very small amount of $NO_x$ is produced.

Figure 17A:
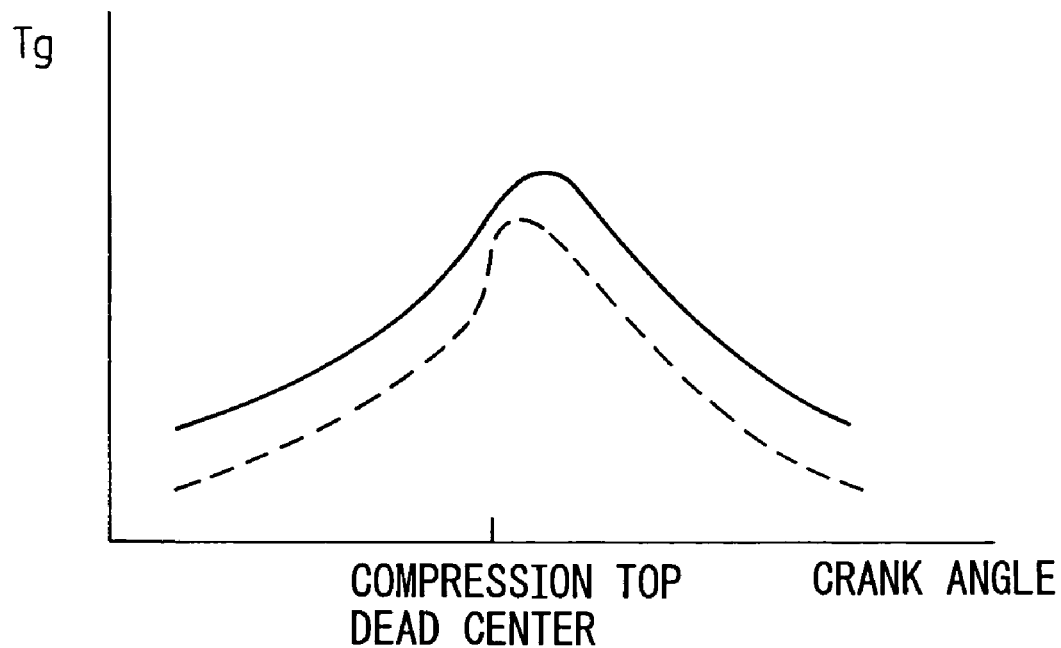
FIGS. 17A and 17B are views of gas temperature etc. in a combustion chamber.

On the other hand, when low temperature combustion is performed, the fuel and surrounding gas temperature becomes lower, but the exhaust gas temperature rises. This will be explained with reference to FIGS. 17A and 17B. The solid line in FIG. 17A shows the relationship between the average gas temperature Tg in the combustion chambers 2 and the crank angle at the time of low temperature combustion, while the broken line in FIG. 17A shows the relationship between the average gas temperature Tg in the combustion chambers 2 and the crank angle at the time of ordinary combustion. Further, the solid line in FIG. 17B shows the relationship between the fuel and surrounding gas temperature Tf and the crank angle at the time of low temperature combustion, while the broken line in FIG. 17B shows the relationship between the fuel and surrounding gas temperature Tf and the crank angle at the time of ordinary combustion.

When low temperature combustion is being performed, the amount of EGR gas becomes greater than when ordinary combustion is being performed. Therefore, as shown in FIG. 17A, before compression top dead center, that is, during the compression stroke, the average gas temperature Tg at the time of low temperature combustion shown by the solid line becomes higher than the average gas temperature Tg at the time of ordinary combustion. Note that at this time, as shown by FIG. 17B, the fuel and surrounding gas temperature Tf becomes about the same temperature as the average gas temperature Tg.

Figure 17B:
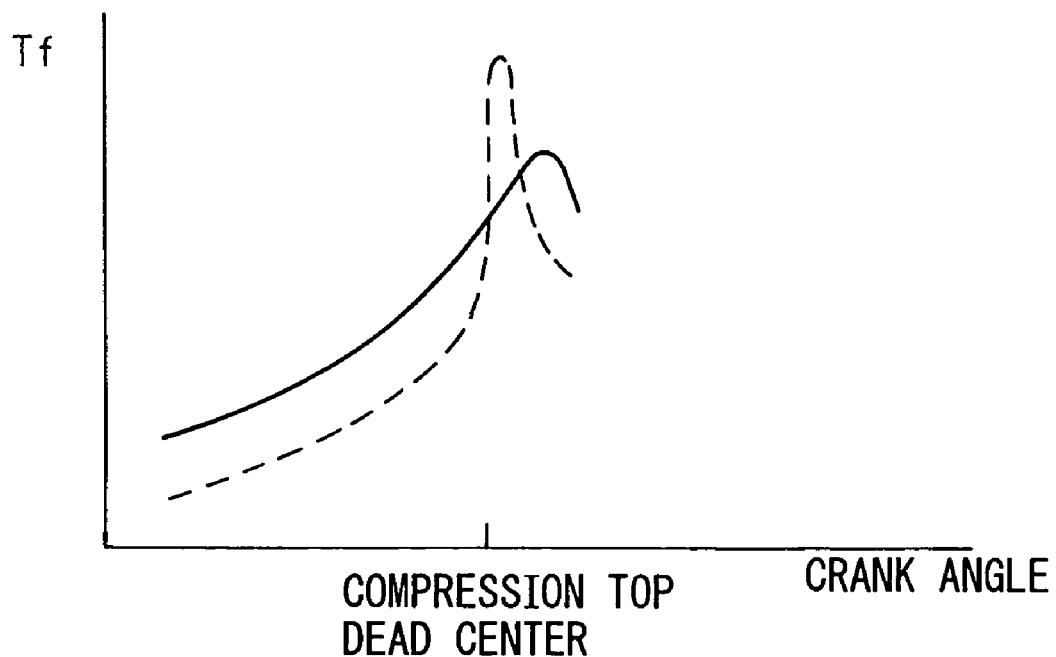

Next, combustion is started near compression top dead center, but in this case, when low temperature combustion is performed, as shown by the solid line in FIG. 17B, the fuel and surrounding gas temperature Tf does not become that high due to the heat absorbing action of the EGR gas. As opposed to this, when ordinary combustion is performed, a large amount of oxygen exists around the fuel, so as shown by the broken line in FIG. 17B, the fuel and surrounding gas temperature Tf becomes extremely high. When performing ordinary combustion in this way, the fuel and surrounding gas temperature Tf becomes considerably higher than the case of low temperature combustion, but the temperature of the gas other than that constituting the majority of the gas becomes lower in the case of ordinary combustion compared with the case of low temperature combustion. Therefore, as shown in FIG. 17A, the average gas temperature Tg in the combustion chambers 2 near compression top dead center becomes higher in the case of ordinary combustion compared with the case of low temperature combustion. As a result, as shown in FIG. 17A, the temperature of the burned gas in the combustion chambers 2 after the end of combustion becomes higher in the case of low temperature combustion compared with the case of ordinary combustion and therefore if low temperature combustion is performed, the temperature of the exhaust gas becomes higher.

Figure 18:
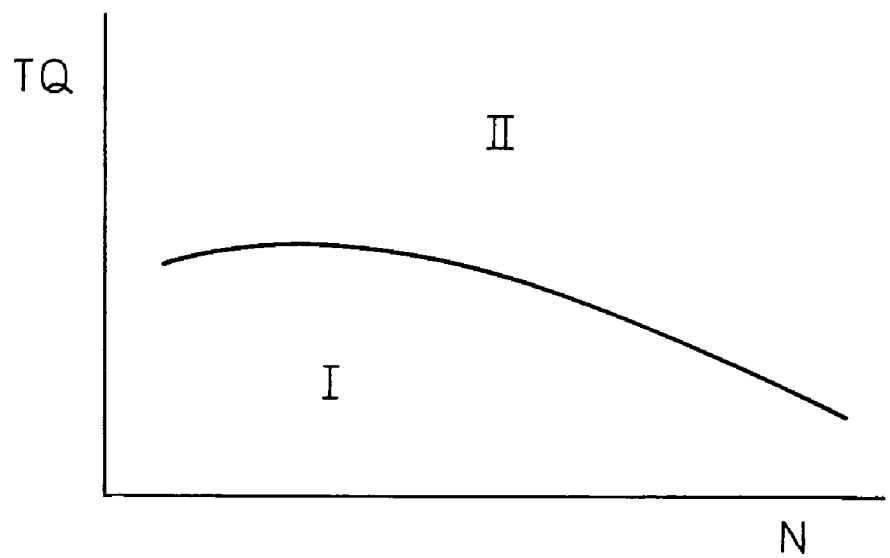
FIG. 18 is a view of operating regions I and II.

However, when the required torque TQ of the engine becomes higher, that is, when the fuel injection amount becomes greater, the temperature of the fuel and the surrounding gas at the time of combustion becomes high, so low temperature combustion becomes difficult. That is, low temperature combustion is performed only at the time of engine medium or low load operation where the amount of heat generated by combustion is relatively small. In FIG. 18, the region I shows the operating region where first combustion with a larger amount of inert gas in the combustion chambers than the amount of inert gas where the production of soot peaks, that is, low temperature combustion, can be performed, while the region II shows the operating region where second combustion with a smaller amount of inert gas in the combustion chambers than the amount of inert gas where the production of soot peaks, that is, only combustion, can be performed.

Figure 19:
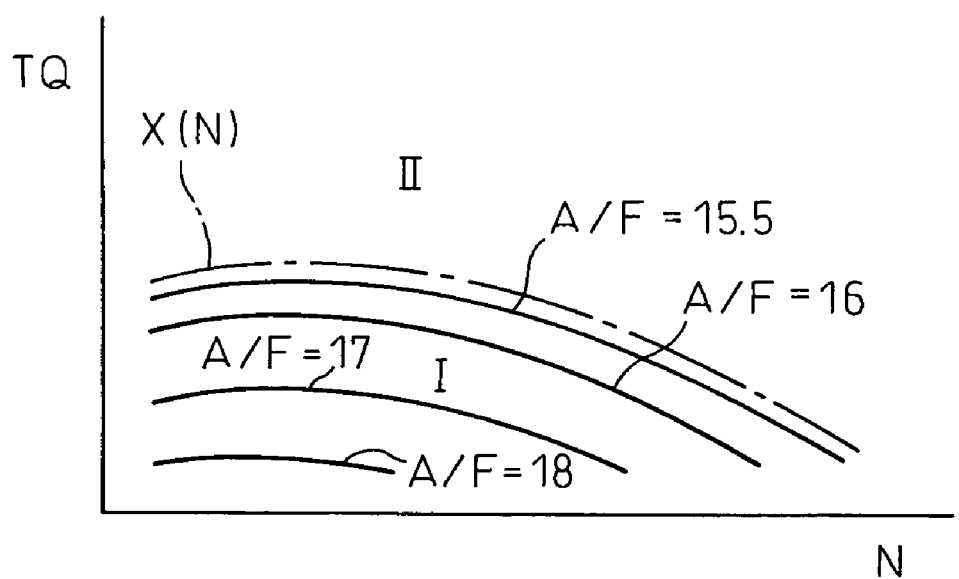
FIG. 19 is a view of an air-fuel ratio A/F.
Figure 20:
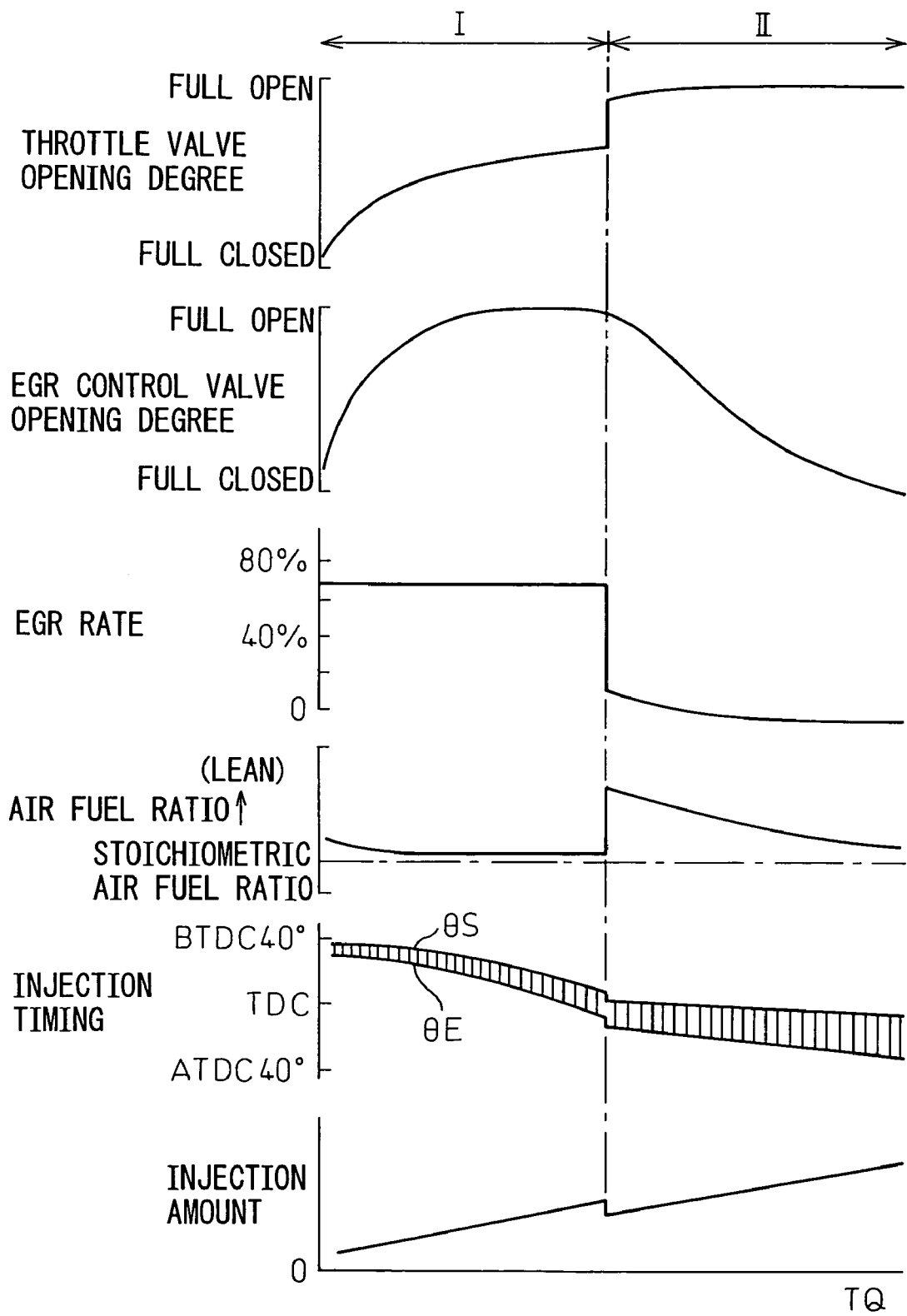
FIG. 20 is a view of changes in throttle valve opening degree etc.

FIG. 19 shows the target air-fuel ratio A/F in the case of low temperature combustion in the operating region I, while FIG. 20 shows the opening degree of the throttle valve 9, the opening degree of the EGR control valve 15, the EGR rate, the air-fuel ratio, the injection start timing θS, the injection end timing θE, and the injection amount in accordance with the required torque TQ in the case of low temperature combustion in the operating region I. Note that FIG. 20 also shows the opening degree of the throttle valve 9 etc. at the time of ordinary combustion performed in the operating region II.

From FIG. 19 and FIG. 20, it will be understood that when performing low temperature combustion in the operating region I, the EGR rate is made at least 55 percent and the air-fuel ratio is made a lean air-fuel ratio of from 15.5 to 18 or so. Note that when performing low temperature combustion in the operating region I as explained above, almost no smoke is produced even if making the air-fuel ratio rich.

When performing low temperature combustion in this way, almost no smoke is produced any longer and the air-fuel ratio can be made rich. Therefore, when the air-fuel ratio of the exhaust gas should be made rich so as to release $NO_x$ or $SO_x$, low temperature combustion is performed and the air-fuel ratio can be made rich under low temperature combustion. Further, when performing low temperature combustion as explained above, the exhaust gas temperature rises. Therefore, to release $SO_x$ or ignite and burn off the deposited particulate, it is also possible to perform low temperature combustion when the exhaust gas temperature should be raised.

Figure 21:
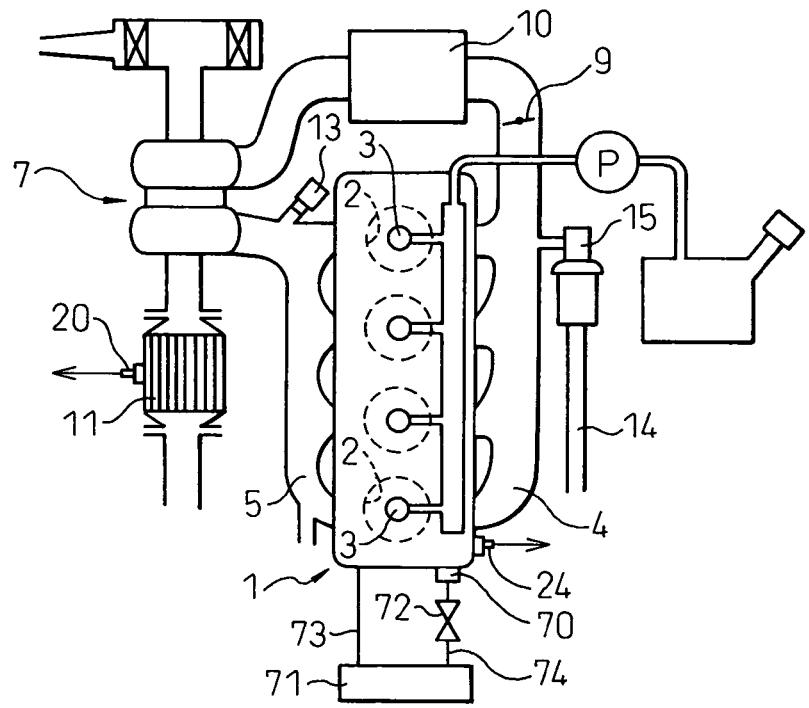
FIG. 21 is an overview of still another embodiment of a compression ignition type internal combustion engine.
Figure 22:
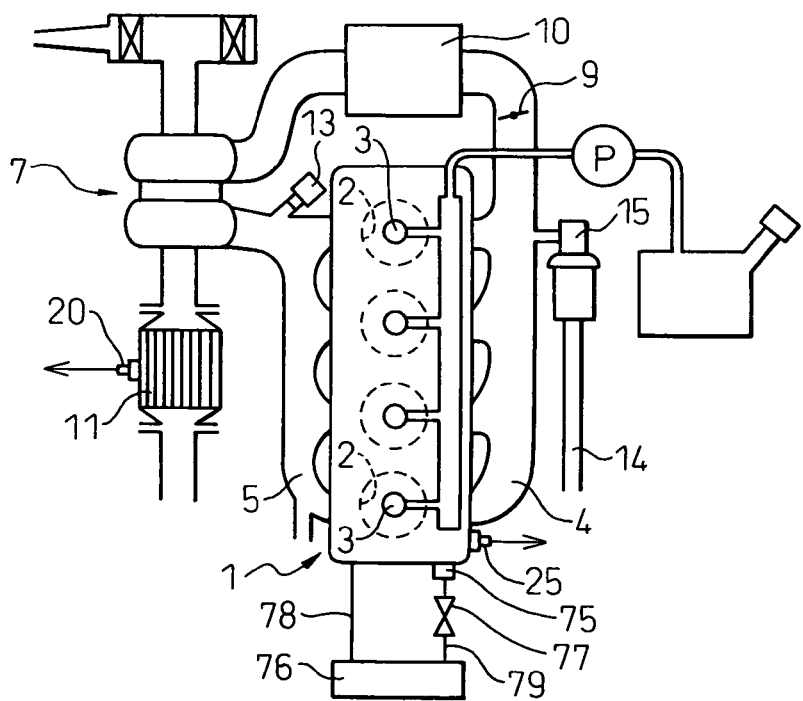
FIG. 22 is an overview of still another embodiment of a compression ignition type internal combustion engine.
Figure 23:
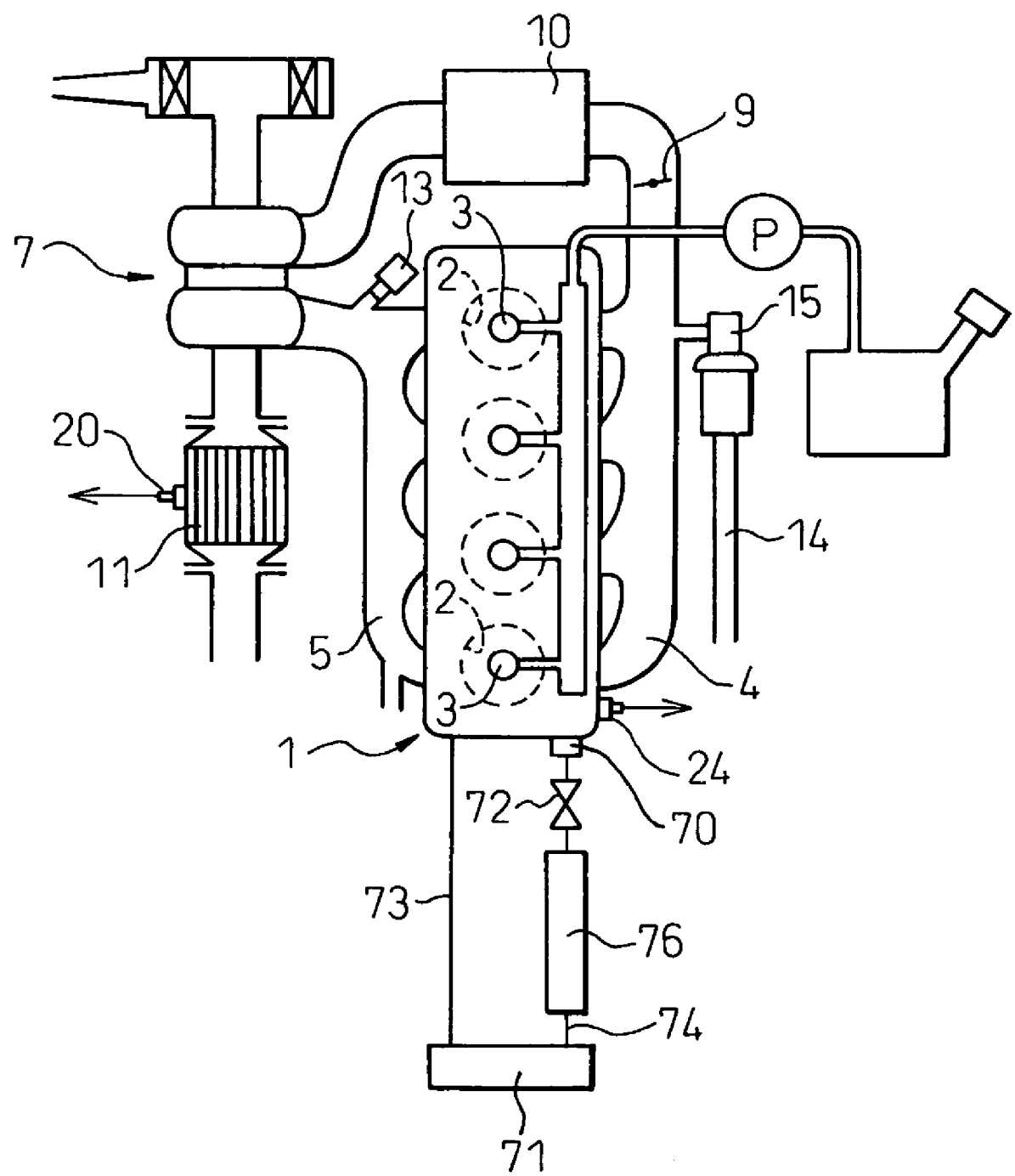
FIG. 23 is an overview of still another embodiment of a compression ignition type internal combustion engine.

In the embodiments explained up to here, the ratio of the $NO_2$ in the exhaust gas is increased by performing slow combustion after engine startup. On the other hand, if maintaining the temperature of the inside wall surfaces of the combustion chambers 2 after engine startup, the atmospheric temperature inside the combustion chambers 2 will fall from the expansion stroke to the exhaust stroke. Therefore, even if maintaining the temperature of the inside wall surfaces of the combustion chambers 2 at a low temperature in this way, the ratio of the $NO_2$ in the exhaust gas can be increased. FIG. 21 to FIG. 23 show various embodiments for increasing the ratio of $NO_2$ in the exhaust gas by maintaining the temperature of the inside wall surfaces of the combustion chambers 2 at a low temperature after engine startup.

Referring to FIG. 21, 70 is an engine-driven water pump, 71 a radiator, 72 a valve for controlling the flow of engine cooling water, and 24 a water temperature sensor for detecting the engine cooling water temperature. When opening the valve 72 at the time of engine operation, the high temperature engine cooling water is sent from the engine body 1 through the conduit 73 to the radiator 71 to be cooled, then the cooled engine cooling water is returned through the conduit 74, the valve 72, and the water pump 70 to the inside of the engine body 1.

At the time of engine startup, normally the valve 72 is made to close and the cooling action of the engine cooling water by the radiator 71 is stopped to promote the engine warmup. However, if the cooling action of the engine cooling water by the radiator 71 is stopped in this way, after engine startup, the temperature of the inside wall surfaces of the combustion chambers 2 will rapidly rise. Therefore, no increase in the amount of production of $NO_2$ can be expected. Accordingly, in this embodiment, after engine startup, the valve 72 is immediately made to open so as to start the cooling action of the engine cooling water by the radiator 71 and thereby maintain the temperature of the inside wall surfaces of the combustion chambers 2 at a low temperature and increase the ratio of the $NO_2$ in the exhaust gas.

On the other hand, when maintaining the temperature of the inside wall surfaces of the combustion chambers 2 at a low temperature in this way, when the $NO_x$ storing catalyst 11 is activated, there is no longer a need to increase the ratio of the $NO_2$ in the exhaust gas. Further, at this time, it is necessary to complete the engine warmup quickly. Therefore, in this embodiment, by making the valve 72 open immediately after engine startup, the cooling action of the engine cooling water by the radiator 71 is started and thereby the temperature of the inside wall surfaces of the combustion chambers 2 is maintained at a low temperature and the ratio of the $NO_2$ in the exhaust gas is increased.

Referring to FIG. 22, 75 indicates an engine-driven oil pump, 76 an oil cooler, 77 a valve controlling the flow of the engine cooling water, and 25 an oil temperature sensor for detecting the engine oil temperature. When the valve 77 opens at the time of engine operation, the high temperature engine oil is sent from the engine body 1 through the conduit 78 to the oil cooler 76 and cooled, then the cooled engine oil is returned through the conduit 79, valve 77, and oil pump 75 to the inside of the engine body 1.

At the time of engine startup, normally the valve 77 is made to close and the cooling action of the engine oil by the oil cooler 76 is stopped to promote the engine warmup. However, if the cooling action of the engine oil by the oil cooler 76 is stopped in this way, after engine startup, the temperature of the inside wall surfaces of the combustion chambers 2 will rapidly rise. Therefore, no increase in the amount of production of $NO_2$ can be expected. Accordingly, in this embodiment, after engine startup, the valve 77 is immediately made to open so as to start the cooling action of the engine oil by the oil cooler 76 and thereby maintain the temperature of the inside wall surfaces of the combustion chambers 2 at a low temperature and increase the ratio of the $NO_2$ in the exhaust gas.

On the other hand, when the temperature of the inside wall surfaces of the combustion chambers 2 is maintained at a low temperature, if the $NO_x$ storing catalyst 11 is activated, the ratio of the $NO_2$ in the exhaust gas will no longer have to be increased. Further, at this time, it will be necessary to end the engine warmup quickly. Therefore, in this embodiment, when the temperature of the inside wall surfaces of the combustion chambers 2 is maintained at a low temperature, when the $NO_x$ storing catalyst 11 is activated, the cooling action of the engine oil by the oil cooler 76 is stopped. When the engine warmup is then completed, the cooling action of the engine oil by the oil cooler 76 is again started.

The embodiment shown in FIG. 23 arranges the oil cooler 76 inside the conduit 74 of the embodiment shown in FIG. 21 and cools the oil cooler 76 by the engine cooling water. This oil cooler 76 is constantly run through by engine oil. When the valve 72 is closed and the cooling action of the engine cooling water by the radiator 71 is stopped, the cooling action of the engine oil by the oil cooler 76 is also stopped.

In this embodiment, by immediately opening the valve 72 after engine startup, the cooling action of the engine cooling water by the radiator 71 is started. Due to this, by starting the cooling action of the engine oil by the oil cooler 76, the temperature of the inside walls of the combustion chambers 2 is maintained at a low temperature and the ratio of the $NO_2$ in the exhaust gas is increased. On the other hand, when maintaining the temperature of the inside walls of the combustion chambers 2 at a low temperature, when the $NO_x$ storing catalyst 11 is activated, the cooling action of the engine cooling water by the radiator 71 is stopped. When the engine warmup is then completed, the cooling action of the engine cooling water by the radiator 71 is again started.

Figure 24:
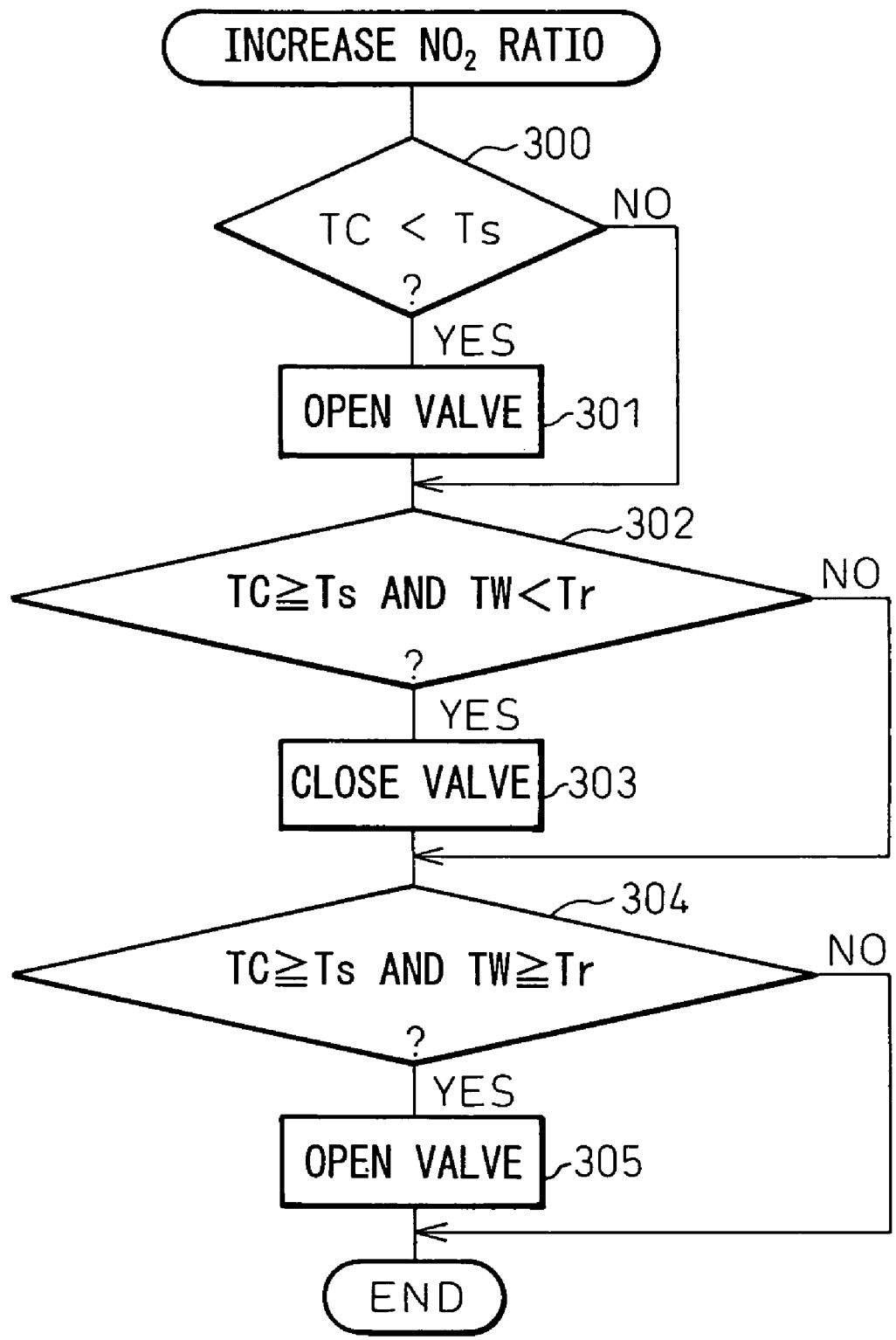
FIG. 24 is a flow chart for increasing the ratio of $NO_2$.

FIG. 24 shows a time interruption routine for increasing the ratio of $NO_2$ in the embodiment shown in FIG. 21 and FIG. 23. Referring to FIG. 24, first, at step 300, it is judged if the temperature TC of the $NO_x$ storing catalyst 11 exceeds the temperature setting Ts, that is, if the $NO_x$ storing catalyst 11 is activated. When TC<Ts, the routine proceeds to step 301, where the valve 72 is opened, whereby the cooling action of the engine cooling water by the radiator 71 is performed. As opposed to this, when $TC \geq Ts$, the routine jumps to step 302.

At step 302, it is judged if $TC \geq Ts$, that is, if the $NO_x$ storing catalyst 11 is activated and the engine cooling water temperature TW is lower than the temperature setting Tr, for example, 80° C., that is, if the engine warmup has not been completed. When TC≧Ts and TW<Tr, the routine proceeds to step 303, where the valve 72 is closed, whereby the cooling action of the engine cooling water by the radiator 71 is stopped. As opposed to this, when TC≧Ts and TW<Tr no longer stand, the routine jumps to step 304.

At step 304, it is judge if TC≧Ts, that is, if the $NO_x$ storing catalyst 11 is activated and the engine cooling water temperature TW is higher than the temperature setting Tr, for example, that is, if engine warmup has been completed. When TC≧Ts and TW≧Tz, the routine proceeds to step 305, where the valve 72 is opened, whereby the cooling action of the engine cooling water by the radiator 71 is restarted. As opposed to this, when TC≧Ts and TW≧Tz do not stand, the processing cycle is ended.

Figure 25:
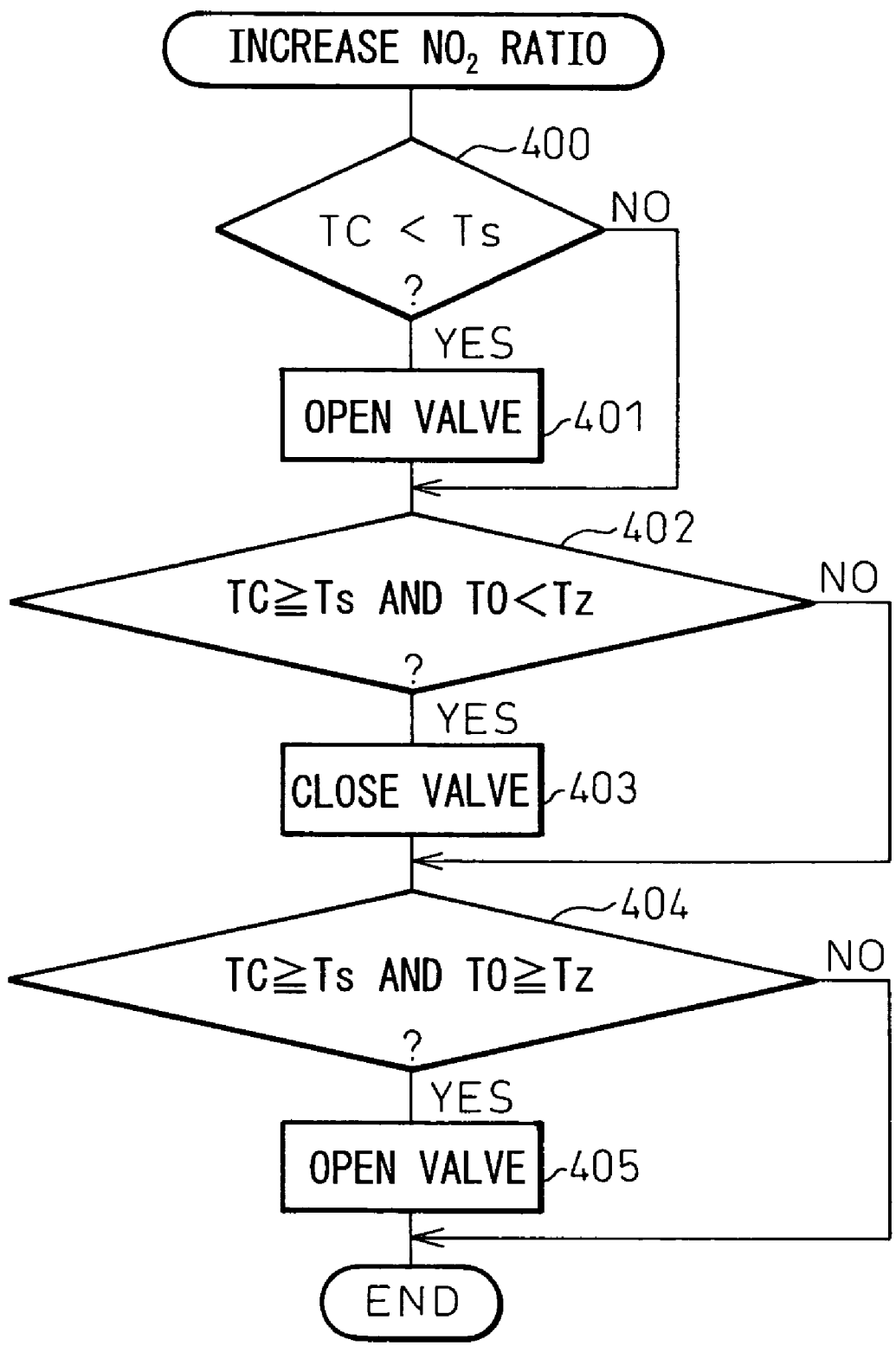
FIG. 25 is a flow chart for increasing the ratio of $NO_2$.

FIG. 25 shows a time interruption routine for increasing the ratio of $NO_2$ in the embodiment shown in FIG. 22. Referring to FIG. 25, first, at step 400, it is judged if the temperature TC of the $NO_x$ storing catalyst 11 exceeds the temperature setting Ts, that is, if the $NO_x$ storing catalyst 11 is activated. When TC<Ts, the routine proceeds to step 401, where the valve 77 is opened, whereby the cooling action of the engine oil by the oil cooler 76 is performed. As opposed to this, when TC≧Ts, the routine jumps to step 402.

At step 402, it is judged if TC≧Ts, that is, if the $NO_x$ storing catalyst 11 is activated and the engine oil temperature TO is lower than the temperature setting Tz, for example, 80° C., that is, if the engine warmup has not been completed. When TC≧Ts and TO<Tz, the routine proceeds to step 403, where the valve 77 is closed, whereby the cooling action of the engine oil by the oil cooler 76 is stopped. As opposed to this, when TC≧Ts and TO<Tz no longer stand, the routine jumps to step 404.

At step 404, it is judge if TC≧Ts, that is, if the $NO_x$ storing catalyst 11 is activated and the engine oil temperature TO is higher than the temperature setting Tz, that is, if engine warmup has been completed. When TC≧Ts and TO≧Tz, the routine proceeds to step 405, where the valve 77 is opened, whereby the cooling action of the engine oil by the oil cooler 76 is restarted. As opposed to this, when TC≧Ts and TO≧Tz do not stand, the processing cycle is ended.

According to the present invention, as explained above, it is possible to purify $NO_x$ in the exhaust gas before the $NO_x$ storing catalyst is activated.

While the invention has been described with reference to specific embodiments chosen for purpose of illustration, it should be apparent that numerous modifications could be made thereto by those skilled in the art without departing from the basic concept and scope of the invention.

What is claimed is:

1. An exhaust purification method of an internal combustion engine comprising:

using a $NO_x$ storing catalyst comprised of a precious metal catalyst and a $NO_x$ absorbent as a catalyst for purifying $NO_x$ in exhaust gas;

increasing a ratio of nitrogen dioxide $NO_2$ with respect to nitrogen monoxide NO produced when burning fuel under a lean air-fuel ratio when said $NO_x$ storing catalyst is not activated compared with when said $NO_x$ storing catalyst is activated under the same engine operating conditions;

storing said nitrogen dioxide $NO_2$ contained in the exhaust gas in said $NO_x$ absorbent at that time;

changing nitrogen dioxide $NO_2$ stored in said $NO_x$ absorbent to nitric acid ions $NO_3^-$ when the temperature of said $NO_x$ storing catalyst rises;

cyclically temporarily switching the air-fuel ratio of the exhaust gas flowing into the $NO_x$ storing catalyst from lean to the stoichiometric air-fuel ratio or rich when said $NO_x$ storing catalyst is activated; and thereby releasing nitrogen oxides $NO_x$ stored in the $NO_x$ absorbent in the form of nitric acid ions $NO_3^-$ from the $NO_x$ absorbent.

2. An exhaust purification device comprising:

a $NO_x$ storing catalyst comprised of a precious metal catalyst and a $NO_x$ absorbent and arranged in an engine exhaust passage, said $NO_x$ absorbent storing nitrogen dioxide $NO_2$ contained in the exhaust gas when an air-fuel ratio of exhaust gas flowing into said $NO_x$ storing catalyst is lean when said $NO_x$ storing catalyst is not activated, said $NO_x$ absorbent storing nitrogen oxides $NO_x$ contained in exhaust gas when the air-fuel ratio of the exhaust gas flowing into the $NO_x$ storing catalyst is lean when said $NO_x$ storing catalyst is activated, said $NO_x$ absorbent releasing stored nitrogen oxides $NO_x$ when the air-fuel ratio of the exhaust gas flowing into the $NO_x$ storing catalyst becomes the stoichiometric air-fuel ratio or rich;

a $NO_2$ ratio increasing apparatus for increasing a ratio of nitrogen dioxide $NO_2$ with respect to nitrogen monoxide NO produced when burning fuel under a lean air-fuel ratio when the $NO_x$ storing catalyst is not activated compared with the time when the $NO_x$ storing catalyst is activated under the same engine operating conditions; and an air-fuel ratio switching apparatus for temporarily switching the air-fuel ratio of the exhaust gas flowing into the $NO_x$ storing catalyst cyclically from lean to the stoichiometric air-fuel ratio or rich so as to release $NO_x$ from the $NO_x$ absorbent when the $NO_x$ storing catalyst is activated.

3. An exhaust purification device as set forth in claim 2, wherein said $NO_2$ ratio increasing apparatus increases the ratio of nitrogen dioxide $NO_2$ with respect to nitrogen monoxide NO after engine startup to activation of the $NO_x$ storing catalyst and stops the action of increasing said ratio when said $NO_x$ storing catalyst is activated.

4. An exhaust purification device as set forth in claim 2, wherein said air-fuel ratio switching apparatus temporarily switches an air-fuel ratio of exhaust gas flowing to said $NO_x$ storing catalyst from lean to the stoichiometric air-fuel ratio or rich immediately to release $NO_x$ from said $NO_x$ absorbent when said $NO_x$ storing catalyst is activated after engine startup.

5. An exhaust purification device as set forth in claim 2, wherein said air-fuel ratio switching apparatus temporarily switches an air-fuel ratio of exhaust gas flowing into said $NO_x$ storing catalyst from lean to the stoichiometric air-fuel ratio or rich to release $NO_x$ from said $NO_x$ absorbent when stopping engine operation.

6. An exhaust purification device as set forth in claim 2, wherein when releasing $SO_x$ absorbed in the $NO_x$ absorbent of said $NO_x$ storing catalyst from said $NO_x$ absorbent, the temperature of the $NO_x$ storing catalyst is raised to a $SO_x$ release temperature, then the temperature of the $NO_x$ storing catalyst is maintained at the $SO_x$ release temperature while the air-fuel ratio of the exhaust gas is made rich.

7. An exhaust purification device as set forth in claim 2, wherein said $NO_x$ storing catalyst is comprised of a particulate filter.

8. An exhaust purification device as set forth in claim 2, wherein the air-fuel ratio of the exhaust gas is made rich by supplying a reducing agent into the engine exhaust passage.

9. An exhaust purification device as set forth in claim 2, wherein said engine is one where when the amount of exhaust gas recirculation is increased, the amount of soot produced gradually increases and then peaks and when the amount of exhaust gas recirculation is further increased, soot is no longer generated much at all and where the air-fuel ratio in the combustion chambers is made rich in the state where the amount of exhaust gas recirculation is increased over the amount where the amount of production of soot peaks so as to make the air-fuel ratio of the exhaust gas rich.

10. An exhaust purification device as set forth in claim 2, wherein said engine is one where when the amount of exhaust gas recirculation is increased, the amount of soot produced gradually increases and then peaks and when the amount of exhaust gas recirculation is further increased, soot is no longer generated much at all and where the amount of exhaust gas recirculation is increased over the amount where the amount of production of soot peaks when the temperature of the $NO_x$ storing catalyst should be raised.

11. An exhaust purification device as set forth in claim 2, wherein said $NO_2$ ratio increasing apparatus performs slow combustion when said $NO_x$ storing catalyst is not activated compared with when said $NO_x$ storing catalyst is activated under the same engine operating conditions.

12. An exhaust purification device as set forth in claim 11, wherein said slow combustion is performed by at least one of delaying a fuel injection timing, increasing an amount of exhaust gas recirculation gas, pilot injection, and premix combustion.

13. An exhaust purification device as set forth in claim 2, wherein said $NO_2$ ratio increasing apparatus starts a cooling action of engine oil by an oil cooler right after engine startup when said $NO_x$ storing catalyst is not activated.

14. An exhaust purification device as set forth in claim 13, wherein said $NO_2$ ratio increasing apparatus stops said cooling action of engine oil by the oil cooler when the temperature of the engine oil is lower than a temperature setting when said $NO_x$ storing catalyst is activated.

15. An exhaust purification device as set forth in claim 2, wherein said device further comprises an apparatus for estimating the amount $NO_x$ absorbed in said $No_x$ absorbent and said air-fuel ratio of said exhaust gas is switched from lean to rich when the estimated amount of $NO_x$ absorption exceeds a predetermined allowable value.

16. An exhaust purification device as set forth in claim 15, wherein said device further comprises a $NO_x$ concentration sensor for detecting a concentration of $NO_x$ in exhaust gas flowing out from said $NO_x$ storing catalyst and it is judged that the amount of $NO_x$ absorption of said $NO_x$ absorbent has exceeded the allowable value when the $NO_x$ concentration detected by said $NO_x$ concentration sensor exceeds a setting.

17. An exhaust purification device as set forth in claim 2, wherein said $NO_2$ ratio increasing apparatus starts a cooling action of engine cooling water by a radiator right after engine startup when said $NO_x$ storing catalyst is not activated.

18. An exhaust purification device as set forth in claim 17, wherein said $NO_2$ ratio increasing apparatus stops said cooling action of engine cooling water by the radiator when the temperature of the engine cooling water is lower than a temperature setting when said $NO_x$ storing catalyst is activated.

19. An exhaust purification device as set forth in claim 17, wherein engine oil is cooled by said engine cooling water.

* * * * *